US012603951B2

(12) United States Patent
Guo

(10) Patent No.: US 12,603,951 B2
(45) Date of Patent: Apr. 14, 2026

(54) ROTATING MECHANISM AND FOLDABLE TERMINAL

(71) Applicant: HONOR DEVICE CO., LTD., Shenzhen (CN)

(72) Inventor: Renwei Guo, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 307 days.

(21) Appl. No.: 18/026,557

(22) PCT Filed: Sep. 8, 2022

(86) PCT No.: PCT/CN2022/117786
§ 371 (c)(1),
(2) Date: Mar. 15, 2023

(87) PCT Pub. No.: WO2023/093215
PCT Pub. Date: Jun. 1, 2023

(65) Prior Publication Data
US 2024/0259488 A1　　Aug. 1, 2024

(30) Foreign Application Priority Data
Nov. 29, 2021　(CN) .......................... 202111434863.6

(51) Int. Cl.
*H04M 1/02*　　　(2006.01)
(52) U.S. Cl.
CPC ......... *H04M 1/0268* (2013.01); *H04M 1/022* (2013.01)

(58) Field of Classification Search
CPC .................................................. H04M 1/0268
See application file for complete search history.

(56) References Cited

U.S. PATENT DOCUMENTS

| | | | |
|---|---|---|---|
| 10,742,784 B1 | 8/2020 | Jo et al. | |
| 11,467,633 B2 | 10/2022 | Liao et al. | |
| 2014/0015743 A1* | 1/2014 | Seo .......................... | G06F 3/017 |
| | | | 345/156 |

(Continued)

FOREIGN PATENT DOCUMENTS

| | | |
|---|---|---|
| CN | 105278627 A | 1/2016 |
| CN | 205750631 U | 11/2016 |

(Continued)

*Primary Examiner* — Steven Lim
(74) *Attorney, Agent, or Firm* — WOMBLE BOND DICKINSON (US) LLP

(57)　　　　ABSTRACT

Embodiments of this application provide a rotating mechanism and a foldable terminal. The foldable terminal includes a display and the rotating mechanism. The display includes a neutral layer. The rotating mechanism includes a limit base, a first swing arm, and a second swing arm, and the limit base is provided with a first arc-shaped groove and a second arc-shaped groove. The first rotating shaft portion includes a first arc-shaped part and a second arc-shaped part that are distributed in a circumferential direction of the first rotating shaft portion, the first arc-shaped part and the second arc-shaped part are fixedly connected, an axle center of the first arc-shaped part and an axle center of the second arc-shaped part are both located at the neutral layer and coincide with each other, and a radius of the first arc-shaped part is different from a radius of the second arc-shaped part.

18 Claims, 6 Drawing Sheets

(56)        References Cited

U.S. PATENT DOCUMENTS

| | | | |
|---|---|---|---|
| 2016/0295709 A1* | 10/2016 | Ahn ........................ | H04M 1/022 |
| 2017/0048996 A1 | 2/2017 | Han et al. | |
| 2018/0004252 A1* | 1/2018 | Ahrens .............. | H04M 1/0214 |
| 2019/0033920 A1* | 1/2019 | Yun ........................ | G06F 1/1641 |
| 2021/0091341 A1* | 3/2021 | Chang ................. | H10K 77/111 |
| 2021/0181808 A1* | 6/2021 | Liao ...................... | G06F 1/1652 |
| 2021/0271294 A1 | 9/2021 | Liao et al. | |
| 2021/0368032 A1 | 11/2021 | Liao et al. | |
| 2022/0276675 A1 | 9/2022 | Hou et al. | |

FOREIGN PATENT DOCUMENTS

| | | | | |
|---|---|---|---|---|
| CN | 109681521 A | | 4/2019 | |
| CN | 110191211 A | | 8/2019 | |
| CN | 111489650 A | | 8/2020 | |
| CN | 111692196 A | | 9/2020 | |
| CN | 112148068 A | * 12/2020 | .......... | G06F 1/1616 |
| CN | 112995368 A | | 6/2021 | |
| CN | 113645328 A | | 11/2021 | |
| CN | 115022430 A | | 9/2022 | |
| WO | 2020186889 A1 | | 9/2020 | |
| WO | 2021072431 A1 | | 4/2021 | |
| WO | WO-2021115462 A1 | * 6/2021 | .............. | F16C 11/04 |
| WO | 2021129882 A1 | | 7/2021 | |
| WO | 2021208998 A1 | | 10/2021 | |
| WO | 2021209008 A1 | | 10/2021 | |

* cited by examiner

ROTATING MECHANISM AND FOLDABLE TERMINAL

CROSS-REFERENCE TO RELATED APPLICATIONS

This application is a national stage of International Application No. PCT/CN2022/117786, filed on Sep. 8, 2022, which claims priority to Chinese Patent Application No. 202111434863.6, filed on Nov. 29, 2021. The disclosures of both of the aforementioned applications are incorporated herein by references in their entireties.

TECHNICAL FIELD

This application relates to the field of foldable terminals, and in particular, to a rotating mechanism and a foldable terminal.

BACKGROUND

With the advancement of science and technology, an era of large-screen intelligent terminals is coming. Foldable terminals are favored by users because of large screens and high portability. Currently, a foldable terminal usually uses a rotating mechanism to implement folding and unfolding. However, an existing rotating mechanism tends to stretch a display during folding, resulting in wrinkles on the display under a stress, which affects use reliability of the foldable terminal.

SUMMARY

This application provides a rotating mechanism and a foldable terminal, so as to reduce stretching of the rotating mechanism on a display during folding of the foldable terminal, and avoid the problem that the display has wrinkles under a stress, thereby ensuring use reliability of the foldable terminal.

According to a first aspect, this application provides a rotating mechanism, used in a foldable terminal. The foldable terminal includes a display, and the display includes a neutral layer. It should be noted that because the display includes a plurality of structural layers, and the structural layers are made of different materials, stretching deformation amounts of the structural layers also vary. During folding of the foldable terminal, some structural layers are stretched, and some structural layers are compressed. The neutral layer may include one or more structural layers. During folding of the foldable terminal, the neutral layer is a layer structure that is neither stretched nor compressed in the display, or the neutral layer is a layer structure that has a small stretching deformation amount and a small compression deformation amount in the display.

The rotating mechanism includes a limit base, a first swing arm, and a second swing arm. The limit base is provided with a first arc-shaped groove and a second arc-shaped groove.

The first swing arm includes a first rotating shaft portion, and the first rotating shaft portion is slidably mounted in the first arc-shaped groove and may rotate with respect to the limit base. The second swing arm includes a second rotating shaft portion, and the second rotating shaft portion is slidably mounted in the second arc-shaped groove and may rotate with respect to the limit base. The first rotating shaft portion and the second rotating shaft portion rotate in opposite directions with respect to the limit base.

For example, the first rotating shaft portion rotates clockwise with respect to the limit base, and the second rotating shaft portion rotates counterclockwise with respect to the limit base. In this case, the first swing arm and the second swing arm rotate with respect to the limit base to be relatively folded. Alternatively, the first rotating shaft portion rotates counterclockwise with respect to the limit base, the second rotating shaft portion rotates clockwise with respect to the limit base, and the first swing arm and the second swing arm rotate with respect to the limit base to be relatively unfolded.

The first rotating shaft portion includes a first arc-shaped part and a second arc-shaped part that are distributed in a circumferential direction of the first rotating shaft portion, the first arc-shaped part and the second arc-shaped part are fixedly connected, an axle center of the first arc-shaped part and an axle center of the second arc-shaped part are both located at the neutral layer and coincide with each other, and a radius of the first arc-shaped part is different from a radius of the second arc-shaped part.

When the rotating mechanism according to this application is used in the foldable terminal, during folding of the foldable terminal, because the axle center of the first arc-shaped part and the axle center of the second arc-shaped part are both located at the neutral layer of the display, a center of rotation of the first swing arm is located at the neutral layer of the display when rotating with respect to the limit base, so that rotation of the first swing arm with respect to the limit base can match a change in the neutral layer. Therefore, a rotation process of the first swing arm can match a bending process of the display, so as to reduce stretching of the rotating mechanism on the display, and avoid the problem that the display has wrinkles due to stretching, thereby ensuring use reliability of the foldable terminal.

In an implementation, a difference between the radius of the first arc-shaped part and the radius of the second arc-shaped part is 0.1 mm~10 cm, so as to reduce an amplitude of a curvature change between the first arc-shaped part and the second arc-shaped part when the first swing arm rotates with respect to the limit base, thereby ensuring smoothness of rotation of the first rotating shaft portion with respect to the limit base.

In an implementation, the second rotating shaft portion includes a third arc-shaped part and a fourth arc-shaped part that are distributed in a circumferential direction of the second rotating shaft portion, the third arc-shaped part and the fourth arc-shaped part are fixedly connected, an axle center of the third arc-shaped part and an axle center of the fourth arc-shaped part are both located at the neutral layer and coincide with each other, and a radius of the third arc-shaped part is different from a radius of the fourth arc-shaped part.

When the rotating mechanism according to this application is used in the foldable terminal, during folding of the foldable terminal, because the axle center of the third arc-shaped part and the axle center of the fourth arc-shaped part are both located at the neutral layer of the display, a center of rotation of the second swing arm is located at the neutral layer of the display when rotating with respect to the limit base, so that rotation of the second swing arm with respect to the limit base can match a change in the neutral layer. Therefore, a rotation process of the second swing arm can match a bending process of the display, so as to reduce stretching of the rotating mechanism on the display, and avoid the problem that the display has wrinkles due to stretching, thereby ensuring use reliability of the foldable terminal.

In an implementation, a difference between the radius of the third arc-shaped part and the radius of the fourth arc-shaped part is 0.1 mm~10 cm, so as to reduce an amplitude of a curvature change between the third arc-shaped part and the fourth arc-shaped part when the second swing arm rotates with respect to the limit base, thereby ensuring smoothness of rotation of the second rotating shaft portion with respect to the limit base.

In an implementation, the first rotating shaft portion further includes a fifth arc-shaped part distributed in the circumferential direction of the first rotating shaft portion, the fifth arc-shaped part is fixedly connected to one end that is of the second arc-shaped part and that is away from the first arc-shaped part, an axle center of the fifth arc-shaped part coincides with the axle center of the second arc-shaped part, and a radius of the fifth arc-shaped part is different from the radius of the second arc-shaped part.

When the rotating mechanism according to this application is used in the foldable terminal, during folding of the foldable terminal, because the axle center of the fifth arc-shaped part is located at the neutral layer of the display, a center of rotation of the first swing arm is always located at the neutral layer of the display when rotating with respect to the limit base, so that rotation of the first swing arm with respect to the limit base can match a change in the neutral layer. Therefore, a rotation process of the first swing arm can match a bending process of the display, so as to reduce stretching of the rotating mechanism on the display, and avoid the problem that the display has wrinkles due to stretching, thereby ensuring use reliability of the foldable terminal.

In an implementation, a difference between the radius of the fifth arc-shaped part and the radius of the second arc-shaped part is 0.1 mm~10 cm, so as to reduce an amplitude of a curvature change between the fifth arc-shaped part and the second arc-shaped part when the first rotating shaft portion rotates with respect to the limit base, thereby ensuring smoothness of the rotation of the first rotating shaft portion with respect to the limit base.

In an implementation, the second rotating shaft portion further includes a sixth arc-shaped part distributed in the circumferential direction of the second rotating shaft portion, the sixth arc-shaped part is fixedly connected to the fourth arc-shaped part, an axle center of the sixth arc-shaped part coincides with an axle center of the fourth arc-shaped part, and a radius of the sixth arc-shaped part is different from the radius of the fourth arc-shaped part.

When the rotating mechanism according to this application is used in the foldable terminal, during folding of the foldable terminal, because the axle center of the sixth arc-shaped part is located at the neutral layer of the display, a center of rotation of the second swing arm is always located at the neutral layer of the display when rotating with respect to the limit base, so that rotation of the second swing arm with respect to the limit base can match a change in the neutral layer. Therefore, a rotation process of the second swing arm can match a bending process of the display, so as to reduce stretching of the rotating mechanism on the display, and avoid the problem that the display has wrinkles due to stretching, thereby ensuring use reliability of the foldable terminal.

In an implementation, a difference between the radius of the sixth arc-shaped part and the radius of the fourth arc-shaped part is 0.1 mm~10 cm, so as to reduce an amplitude of a curvature change between the sixth arc-shaped part and the fourth arc-shaped part when the second rotating shaft portion rotates with respect to the limit base, thereby ensuring smoothness of the rotation of the second rotating shaft portion with respect to the limit base.

In an implementation, the first swing arm further includes a first swing portion fixedly connected to the first rotating shaft portion, and the first swing portion extends relative to the first arc-shaped groove. When rotating with respect to the limit base, the first swing portion drives the first rotating shaft portion to slide in the first arc-shaped groove, so that the first rotating shaft portion rotates with respect to the limit base, and then the first swing arm rotates with respect to the limit base.

The second swing arm further includes a second swing portion fixedly connected to the second rotating shaft portion, and the second swing portion extends relative to the second arc-shaped groove. When rotating with respect to the limit base, the second swing portion drives the second rotating shaft portion to slide in the second arc-shaped groove, so that the second rotating shaft portion rotates with respect to the limit base, and then the second swing arm rotates with respect to the limit base.

In an implementation, the limit base is provided with two first arc-shaped grooves and two second arc-shaped grooves. In a Y-axis direction, the two first arc-shaped grooves are spaced apart, and the two second arc-shaped grooves are spaced apart.

The rotating mechanism includes two first swing arms and two second swing arms. Two first rotating shaft portions are slidably mounted in the two first arc-shaped grooves respectively, and two second rotating shaft portions are slidably mounted in the two second arc-shaped grooves respectively, so as to improve rotation stability of the rotating mechanism.

In an implementation, the rotating mechanism has a symmetry plane, and the rotating mechanism is mirror-symmetrical with respect to the symmetry plane to ensure rotation stability of the rotating mechanism.

In an implementation, the limit base includes a lower limit block and an upper limit block, and the upper limit block is mounted on the lower limit block and encloses with the lower limit block to form the first arc-shaped groove and the second arc-shaped groove.

The upper limit block and the lower limit block may be integrally formed, or the upper limit block and the lower limit block may be assembled to form an integrated structure, so as to ensure an overall strength of the rotating mechanism.

In an implementation, the rotating mechanism further includes a housing, and the limit base, the first swing arm, and the second swing arm are mounted on an inner side of the housing.

According to a second aspect, this application provides a rotating mechanism, used in a foldable terminal. The foldable terminal includes a display, and the display includes a neutral layer. It should be noted that because the display includes a plurality of structural layers, and the structural layers are made of different materials, stretchability of the structural layers also varies. During folding of the foldable terminal, stretchability of the structural layers of the display varies: Some structural layers are stretched, and some structural layers are compressed. The neutral layer may include one or more structural layers. During folding of the foldable terminal, the neutral layer is a layer structure that is neither stretched nor compressed in the display, or the neutral layer is a layer structure that has a low stretching rate and a low compression rate in the display.

The rotating mechanism includes a limit base, a first swing arm, and a second swing arm. The limit base is provided with a first arc-shaped groove and a second arc-shaped groove. The first swing arm includes a first rotating shaft portion, and the first rotating shaft portion is slidably mounted in the first arc-shaped groove and may rotate with respect to the limit base. The second swing arm includes a second rotating shaft portion, and the second rotating shaft portion is slidably mounted in the second arc-shaped groove and may rotate with respect to the limit base. The first rotating shaft portion and the second rotating shaft portion rotate in opposite directions with respect to the limit base.

The first rotating shaft portion includes a first arc-shaped part and a second arc-shaped part that are distributed in a circumferential direction of the first rotating shaft portion, the first arc-shaped part and the second arc-shaped part are fixedly connected, and an axle center of the first arc-shaped part and an axle center of the second arc-shaped part are both located at the neutral layer and are spaced apart from each other.

When the rotating mechanism according to this application is used in the foldable terminal, during folding of the foldable terminal, because the axle center of the first arc-shaped part and the axle center of the second arc-shaped part are both located at the neutral layer of the display, a center of rotation of the first swing arm is located at the neutral layer of the display when rotating with respect to the limit base, so that rotation of the first swing arm with respect to the limit base can match a change in the neutral layer. Therefore, a rotation process of the first swing arm can match a bending process of the display, so as to reduce stretching of the rotating mechanism on the display, and avoid the problem that the display has wrinkles due to stretching, thereby ensuring use reliability of the foldable terminal.

In an implementation, a radius of the first arc-shaped part is the same as a radius of the second arc-shaped part, or a difference between the radius of the first arc-shaped part and the radius of the second arc-shaped part is 0.1 mm~10 cm, so as to reduce an amplitude of a curvature change between the first arc-shaped part and the second arc-shaped part when the first rotating shaft portion rotates with respect to the limit base, thereby ensuring smoothness of the rotation of the first rotating shaft portion with respect to the limit base.

In an implementation, the second rotating shaft portion includes a third arc-shaped part and a fourth arc-shaped part that are distributed in a circumferential direction of the second rotating shaft portion, the third arc-shaped part and the fourth arc-shaped part are fixedly connected, and an axle center of the third arc-shaped part and an axle center of the fourth arc-shaped part are both located at the neutral layer and are spaced apart from each other.

When the rotating mechanism according to this application is used in the foldable terminal, during folding of the foldable terminal, because the axle center of the third arc-shaped part and the axle center of the fourth arc-shaped part are both located at the neutral layer of the display, a center of rotation of the second swing arm is located at the neutral layer of the display when rotating with respect to the limit base, so that rotation of the second swing arm with respect to the limit base can match a change in the neutral layer. Therefore, a rotation process of the second swing arm can match a bending process of the display, so as to reduce stretching of the rotating mechanism on the display, and avoid the problem that the display has wrinkles due to stretching, thereby ensuring use reliability of the foldable terminal.

In an implementation, a radius of the third arc-shaped part is the same as a radius of the fourth arc-shaped part, or a difference between the radius of the third arc-shaped part and the radius of the fourth arc-shaped part is 0.1 mm~10 cm, so as to reduce an amplitude of a curvature change between the third arc-shaped part and the fourth arc-shaped part when the second swing arm rotates with respect to the limit base, thereby ensuring smoothness of rotation of the second rotating shaft portion with respect to the limit base.

In an implementation, the first rotating shaft portion further includes a fifth arc-shaped part distributed in the circumferential direction of the first rotating shaft portion, the fifth arc-shaped part is fixedly connected to one end that is of the second arc-shaped part and that is away from the first arc-shaped part, and an axle center of the fifth arc-shaped part is located at the neutral layer and is spaced apart from the axle center of the second arc-shaped part.

When the rotating mechanism according to this application is used in the foldable terminal, during folding of the foldable terminal, because the axle center of the fifth arc-shaped part is located at the neutral layer of the display, a center of rotation of the first swing arm is always located at the neutral layer of the display when rotating with respect to the limit base, so that rotation of the first swing arm with respect to the limit base can match a change in the neutral layer. Therefore, a rotation process of the first swing arm can match a bending process of the display, so as to reduce stretching of the rotating mechanism on the display, and avoid the problem that the display has wrinkles due to stretching, thereby ensuring use reliability of the foldable terminal.

In an implementation, a radius of the fifth arc-shaped part is the same as the radius of the second arc-shaped part, or the radius of the fifth arc-shaped part is different from the radius of the second arc-shaped part, and a difference between the radius of the fifth arc-shaped part and the radius of the second arc-shaped part is 0.1 mm~10 cm, so as to reduce an amplitude of a curvature change between the fifth arc-shaped part and the second arc-shaped part when the first rotating shaft portion rotates with respect to the limit base, thereby ensuring smoothness of the rotation of the first rotating shaft portion with respect to the limit base.

In an implementation, the second rotating shaft portion further includes a sixth arc-shaped part distributed in the circumferential direction of the second rotating shaft portion, the sixth arc-shaped part is fixedly connected to the fourth arc-shaped part, and an axle center of the sixth arc-shaped part is located at the neutral layer and is spaced apart from the axle center of the fourth arc-shaped part.

When the rotating mechanism according to this application is used in the foldable terminal, during folding of the foldable terminal, because the axle center of the sixth arc-shaped part is located at the neutral layer of the display, a center of rotation of the second swing arm is always located at the neutral layer of the display when rotating with respect to the limit base, so that rotation of the second swing arm with respect to the limit base can match a change in the neutral layer. Therefore, a rotation process of the second swing arm can match a bending process of the display, so as to reduce stretching of the rotating mechanism on the display, and avoid the problem that the display has wrinkles due to stretching, thereby ensuring use reliability of the foldable terminal.

In an implementation, a radius of the sixth arc-shaped part is the same as the radius of the fourth arc-shaped part, or the radius of the sixth arc-shaped part is different from the radius of the fourth arc-shaped part, and a difference between the radius of the sixth arc-shaped part and the radius of the fourth arc-shaped part is 0.1 mm~10 cm, so as to reduce an amplitude of a curvature change between the sixth arc-shaped part and the fourth arc-shaped part when the second rotating shaft portion rotates with respect to the limit base, thereby ensuring smoothness of the rotation of the second rotating shaft portion with respect to the limit base.

In an implementation, the first swing arm further includes a first swing portion fixedly connected to the first rotating shaft portion, and the first swing portion extends relative to the first arc-shaped groove. When rotating with respect to the limit base, the first swing portion drives the first rotating shaft portion to slide in the first arc-shaped groove, so that the first rotating shaft portion rotates with respect to the limit base, and then the first swing arm rotates with respect to the limit base.

The second swing arm further includes a second swing portion fixedly connected to the second rotating shaft portion, and the second swing portion extends relative to the second arc-shaped groove. When rotating with respect to the limit base, the second swing portion drives the second rotating shaft portion to slide in the second arc-shaped groove, so that the second rotating shaft portion rotates with respect to the limit base, and then the second swing arm rotates with respect to the limit base.

In an implementation, the limit base is provided with two first arc-shaped grooves and two second arc-shaped grooves. In a Y-axis direction, the two first arc-shaped grooves are spaced apart, and the two second arc-shaped grooves are spaced apart.

The rotating mechanism includes two first swing arms and two second swing arms. Two first rotating shaft portions are slidably mounted in the two first arc-shaped grooves respectively, and two second rotating shaft portions are slidably mounted in the two second arc-shaped grooves respectively, so as to improve rotation stability of the rotating mechanism.

In an implementation, the rotating mechanism has a symmetry plane, and the rotating mechanism is mirror-symmetrical with respect to the symmetry plane to ensure rotation stability of the rotating mechanism.

In an implementation, the limit base includes a lower limit block and an upper limit block, and the upper limit block is mounted on the lower limit block and encloses with the lower limit block to form the first arc-shaped groove and the second arc-shaped groove.

The upper limit block and the lower limit block may be integrally formed, or the upper limit block and the lower limit block may be assembled to form an integrated structure, so as to ensure an overall strength of the rotating mechanism.

In an implementation, the rotating mechanism further includes a housing, and the limit base, the first swing arm, and the second swing arm are mounted on an inner side of the housing.

According to a third aspect, this application provides a rotating mechanism, used in a foldable terminal. The foldable terminal includes a display, and the display includes a first structural layer and a second structural layer that are laminated. During folding of the foldable terminal, a stretching deformation amount of the first structural layer is greater than that of the second structural layer.

The rotating mechanism includes a limit base, a first swing arm, and a second swing arm. The limit base is provided with a first arc-shaped groove and a second arc-shaped groove. The first swing arm includes a first rotating shaft portion, and the first rotating shaft portion is slidably mounted in the first arc-shaped groove and may rotate with respect to the limit base. The second swing arm includes a second rotating shaft portion, and the second rotating shaft portion is slidably mounted in the second arc-shaped groove and may rotate with respect to the limit base. The first rotating shaft portion and the second rotating shaft portion rotate in opposite directions with respect to the limit base.

The first rotating shaft portion includes a first arc-shaped part and a second arc-shaped part that are distributed in a circumferential direction of the first rotating shaft portion, the first arc-shaped part and the second arc-shaped part are fixedly connected, an axle center of the first arc-shaped part is located at the first structural layer, an axle center of the second arc-shaped part is located at the second structural layer, and the axle center located in the first arc-shaped part is away from one side of the second swing arm.

When the rotating mechanism according to this application is used in the foldable terminal, during folding of the foldable terminal, because the axle center of the first arc-shaped part is located at the first structural layer, the axle center of the second arc-shaped part is located at the second structural layer, and the axle center located in the first arc-shaped part is away from one side of the second swing arm, a stretching deformation amount of the first structural layer may be reduced to match that of the second structural layer, so that a degree of matching between the first structural layer and the second structural layer may be improved. Therefore, a rotation process of the first swing arm with respect to the limit base can match a bending process of the display 200, so as to reduce stretching of the rotating mechanism on the display, and avoid the problem that the display has wrinkles due to stretching, thereby ensuring use reliability of the foldable terminal.

In an implementation, a radius of the first arc-shaped part is the same as a radius of the second arc-shaped part, or the radius of the first arc-shaped part is different from the radius of the second arc-shaped part, and a difference between the radius of the first arc-shaped part and the radius of the second arc-shaped part is 0.1 mm~10 cm, so as to reduce an amplitude of a curvature change between the first arc-shaped part and the second arc-shaped part when the first rotating shaft portion rotates with respect to the limit base, thereby ensuring smoothness of the rotation of the first rotating shaft portion with respect to the limit base.

In an implementation, the second rotating shaft portion includes a third arc-shaped part and a fourth arc-shaped part that are distributed in a circumferential direction of the second rotating shaft portion, the third arc-shaped part and the fourth arc-shaped part are fixedly connected, an axle center of the third arc-shaped part is located at the first structural layer, an axle center of the fourth arc-shaped part is located at the second structural layer, and the axle center located in the third arc-shaped part is away from one side of the first swing arm.

When the rotating mechanism according to this application is used in the foldable terminal, during folding of the foldable terminal, because the axle center of the third arc-shaped part is located at the first structural layer, the axle center of the fourth arc-shaped part is located at the second structural layer, and the axle center located in the third arc-shaped part is away from one side of the first swing arm, a stretching deformation amount of the first structural layer may be reduced to match that of the second structural layer, so that a degree of matching between the first structural layer and the second structural layer may be improved. Therefore, a rotation process of the second swing arm with respect to the limit base can match a bending process of the display, so as to reduce excessive stretching on the first structural layer during rotation of the second swing arm, and then reduce stretching of the rotating mechanism on the display, and avoid the problem that the display has wrinkles due to stretching, thereby ensuring use reliability of the foldable terminal.

In an implementation, a radius of the third arc-shaped part is the same as a radius of the fourth arc-shaped part, or a difference between the radius of the third arc-shaped part and the radius of the fourth arc-shaped part is 0.1 mm~10 cm, so as to reduce an amplitude of a curvature change between the third arc-shaped part and the fourth arc-shaped part when the second swing arm rotates with respect to the limit base, thereby ensuring smoothness of rotation of the second rotating shaft portion with respect to the limit base.

In an implementation, the display further includes a third structural layer; the third structural layer, the first structural layer, and the second structural layer are laminated; and during folding of the foldable terminal, a stretching deformation amount of the third structural layer is less than that of the second structural layer.

The first rotating shaft portion further includes a fifth arc-shaped part distributed in the circumferential direction of the first rotating shaft portion, the fifth arc-shaped part is fixedly connected to one end that is of the second arc-shaped part and that is away from the first arc-shaped part, an axle center of the fifth arc-shaped part is located at the third structural layer, and the axle center located in the second arc-shaped part is away from one side of the second swing arm.

When the rotating mechanism according to this application is used in the foldable terminal, during folding of the foldable terminal, because the axle center of the fifth arc-shaped part is located at the third structural layer, and the axle center located in the second arc-shaped part is away from one side of the second swing arm, a stretching deformation amount of the first structural layer and a stretching deformation amount of the second structural layer may be reduced to match a stretching deformation amount of the third structural layer, so that a degree of matching among the first structural layer, the second structural layer, and the third structural layer may be improved. Therefore, a rotation process of the first swing arm with respect to the limit base can match a bending process of the display, so as to reduce stretching of the rotating mechanism on the display, and avoid the problem that the display has wrinkles due to stretching, thereby ensuring use reliability of the foldable terminal.

In an implementation, a radius of the fifth arc-shaped part is the same as the radius of the second arc-shaped part, or the radius of the fifth arc-shaped part is different from the radius of the second arc-shaped part, and a difference between the radius of the fifth arc-shaped part and the radius of the second arc-shaped part is 0.1 mm~10 cm, so as to reduce an amplitude of a curvature change between the fifth arc-shaped part and the second arc-shaped part when the first rotating shaft portion rotates with respect to the limit base, thereby ensuring smoothness of the rotation of the first rotating shaft portion with respect to the limit base.

In an implementation, the second rotating shaft portion further includes a sixth arc-shaped part distributed in the circumferential direction of the second rotating shaft portion, the sixth arc-shaped part is fixedly connected to the fourth arc-shaped part, an axle center of the sixth arc-shaped part is located at the third structural layer, and the axle center located in the fourth arc-shaped part is away from one side of the first swing arm.

When the rotating mechanism according to this application is used in the foldable terminal, during folding of the foldable terminal, because the axle center of the sixth arc-shaped part is located at the third structural layer, and the axle center located in the fourth arc-shaped part is away from one side of the first swing arm, a stretching deformation amount of the first structural layer and a stretching deformation amount of the second structural layer may be reduced to match a stretching deformation amount of the third structural layer, so that a degree of matching among the first structural layer, the second structural layer, and the third structural layer may be improved. Therefore, a rotation process of the second swing arm with respect to the limit base can match a bending process of the display, so as to reduce stretching of the rotating mechanism on the display, and avoid the problem that the display has wrinkles due to stretching, thereby ensuring use reliability of the foldable terminal.

In an implementation, a radius of the sixth arc-shaped part is the same as the radius of the fourth arc-shaped part, or the radius of the sixth arc-shaped part is different from the radius of the fourth arc-shaped part, and a difference between the radius of the sixth arc-shaped part and the radius of the fourth arc-shaped part is 0.1 mm~10 cm, so as to reduce an amplitude of a curvature change between the sixth arc-shaped part and the fourth arc-shaped part when the second rotating shaft portion rotates with respect to the limit base, thereby ensuring smoothness of the rotation of the second rotating shaft portion with respect to the limit base.

In an implementation, the first swing arm further includes a first swing portion fixedly connected to the first rotating shaft portion, and the first swing portion extends relative to the first arc-shaped groove. When rotating with respect to the limit base, the first swing portion drives the first rotating shaft portion to slide in the first arc-shaped groove, so that the first rotating shaft portion rotates with respect to the limit base, and then the first swing arm rotates with respect to the limit base.

The second swing arm further includes a second swing portion fixedly connected to the second rotating shaft portion, and the second swing portion extends relative to the second arc-shaped groove. When rotating with respect to the limit base, the second swing portion drives the second rotating shaft portion to slide in the second arc-shaped groove, so that the second rotating shaft portion rotates with respect to the limit base, and then the second swing arm rotates with respect to the limit base.

In an implementation, the limit base is provided with two first arc-shaped grooves and two second arc-shaped grooves. In a Y-axis direction, the two first arc-shaped grooves are spaced apart, and the two second arc-shaped grooves are spaced apart.

The rotating mechanism includes two first swing arms and two second swing arms. Two first rotating shaft portions are slidably mounted in the two first arc-shaped grooves respectively, and two second rotating shaft portions are slidably mounted in the two second arc-shaped grooves respectively, so as to improve rotation stability of the rotating mechanism.

In an implementation, the rotating mechanism has a symmetry plane, and the rotating mechanism is mirror-symmetrical with respect to the symmetry plane to ensure rotation stability of the rotating mechanism.

In an implementation, the limit base includes a lower limit block and an upper limit block, and the upper limit block is mounted on the lower limit block and encloses with the lower limit block to form the first arc-shaped groove and the second arc-shaped groove.

The upper limit block and the lower limit block may be integrally formed, or the upper limit block and the lower limit block may be assembled to form an integrated structure, so as to ensure an overall strength of the rotating mechanism.

In an implementation, the rotating mechanism further includes a housing, and the limit base, the first swing arm, and the second swing arm are mounted on an inner side of the housing.

According to a fourth aspect, this application provides a foldable terminal, including a first housing, a second housing, a display, and any rotating mechanism according to the first aspect or the second aspect. The first swing arm is fixedly connected to the first housing, the second swing arm is fixedly connected to the second housing, the display includes a neutral layer, an axle center of the first arc-shaped part and an axle center of the second arc-shaped part are both located at the neutral layer and coincide with each other, and a radius of the first arc-shaped part is different from a radius of the second arc-shaped part.

The first swing portion is fixedly connected to the first housing, and the second swing portion is fixedly connected to the second housing.

During folding of the foldable terminal according to this application, because the axle center of the first arc-shaped part and the axle center of the second arc-shaped part are both located at the neutral layer of the display, a center of rotation of the first swing arm is located at the neutral layer of the display when rotating with respect to the limit base, so that rotation of the first swing arm with respect to the limit base can match a change in the neutral layer. Therefore, a rotation process of the first swing arm can match a bending process of the display, so as to reduce stretching of the rotating mechanism on the display, and avoid the problem that the display has wrinkles due to stretching, thereby ensuring use reliability of the foldable terminal.

In an implementation, the display includes a plurality of structural layers, and the neutral layer includes one or more structural layers.

In an implementation, the display includes a substrate layer, a display functional layer, a polarizer, a bonding layer, and a protective layer, and the display functional layer, the polarizer, the bonding layer, and the protective layer are sequentially laminated on a top surface of the substrate layer.

In an implementation, the neutral layer includes the display functional layer, an axle center of the first arc-shaped part and an axle center of the second arc-shaped part are both located at the display functional layer, so as to prevent the display functional layer from being split due to excessive stretching during folding of the foldable terminal, thereby ensuring use reliability of the foldable terminal.

In an implementation, the neutral layer includes the polarizer, and the axle center of the first arc-shaped part and the axle center of the second arc-shaped part are both located in the polarizer.

In some other implementations, the neutral layer includes the display functional layer and the polarizer, and the axle center of the first arc-shaped part and the axle center of the second arc-shaped part are both located in the display functional layer or the polarizer.

In an implementation, the display includes a first display part, a second display part, and a bendable part, the bendable part is connected between the first display part and the second display part, the first display part is mounted on the first housing, the second display part is mounted on the second housing, and the bendable part is disposed opposite to the rotating mechanism.

According to a fifth aspect, this application provides a foldable terminal, including a first housing, a second housing, a display, and any rotating mechanism according to the third aspect. The first swing arm is fixedly connected to the first housing, and the second swing arm is fixedly connected to the second housing. The first swing portion is fixedly connected to the first housing, and the second swing portion is fixedly connected to the second housing. The display is mounted on the first housing and the second housing, and the display includes the first structural layer and the second structural layer.

During folding of the foldable terminal according to this application, because the axle center of the first arc-shaped part is located at the first structural layer, the axle center of the second arc-shaped part is located at the second structural layer, and the axle center located in the first arc-shaped part is away from one side of the second swing arm, a stretching deformation amount of the first structural layer may be reduced to match that of the second structural layer, so that a degree of matching between the first structural layer and the second structural layer may be improved, so as to reduce excessive stretching on the first structural layer during rotation of the first swing arm, and then reduce stretching of the rotating mechanism on the display, and avoid the problem that the display has wrinkles due to stretching, thereby ensuring use reliability of the foldable terminal.

In an implementation, the display further includes a third structural layer; the third structural layer, the first structural layer, and the second structural layer are laminated; and during folding of the foldable terminal, a stretching deformation amount of the third structural layer is less than that of the second structural layer.

The first rotating shaft portion further includes a fifth arc-shaped part distributed in the circumferential direction of the first rotating shaft portion, the fifth arc-shaped part is fixedly connected to one end that is of the second arc-shaped part and that is away from the first arc-shaped part, an axle center of the fifth arc-shaped part is located at the third structural layer, and the axle center located in the second arc-shaped part is away from one side of the second swing arm.

During folding of the foldable terminal according to this application, because the axle center of the fifth arc-shaped part is located at the third structural layer, and the axle center located in the second arc-shaped part is away from one side of the second swing arm, a stretching deformation amount of the first structural layer and a stretching deformation amount of the second structural layer may be reduced to match a stretching deformation amount of the third structural layer, so that a degree of matching among the first structural layer, the second structural layer, and the third structural layer may be improved. Therefore, a rotation process of the first swing arm with respect to the limit base can match a bending process of the display, so as to reduce stretching of the rotating mechanism on the display, and avoid the problem that the display has wrinkles due to stretching, thereby ensuring use reliability of the foldable terminal.

In an implementation, the display includes a substrate layer, a display functional layer, a polarizer, a bonding layer, and a protective layer that are sequentially laminated, the substrate layer is the first structural layer, the display functional layer is the second structural layer, and the polarizer is the third structural layer.

In an implementation, the display includes a first display part, a second display part, and a bendable part, the bendable part is connected between the first display part and the second display part, the first display part is mounted on the first housing, the second display part is mounted on the second housing, and the bendable part is disposed opposite to the rotating mechanism.

BRIEF DESCRIPTION OF DRAWINGS

To describe technical solutions in embodiments of this application more clearly, the following describes accompanying drawings required in embodiments of this application.

DESCRIPTION OF EMBODIMENTS

The following clearly describes technical solutions in embodiments of this application with reference to accompanying drawings in embodiments of this application.

Figures 1, 2:
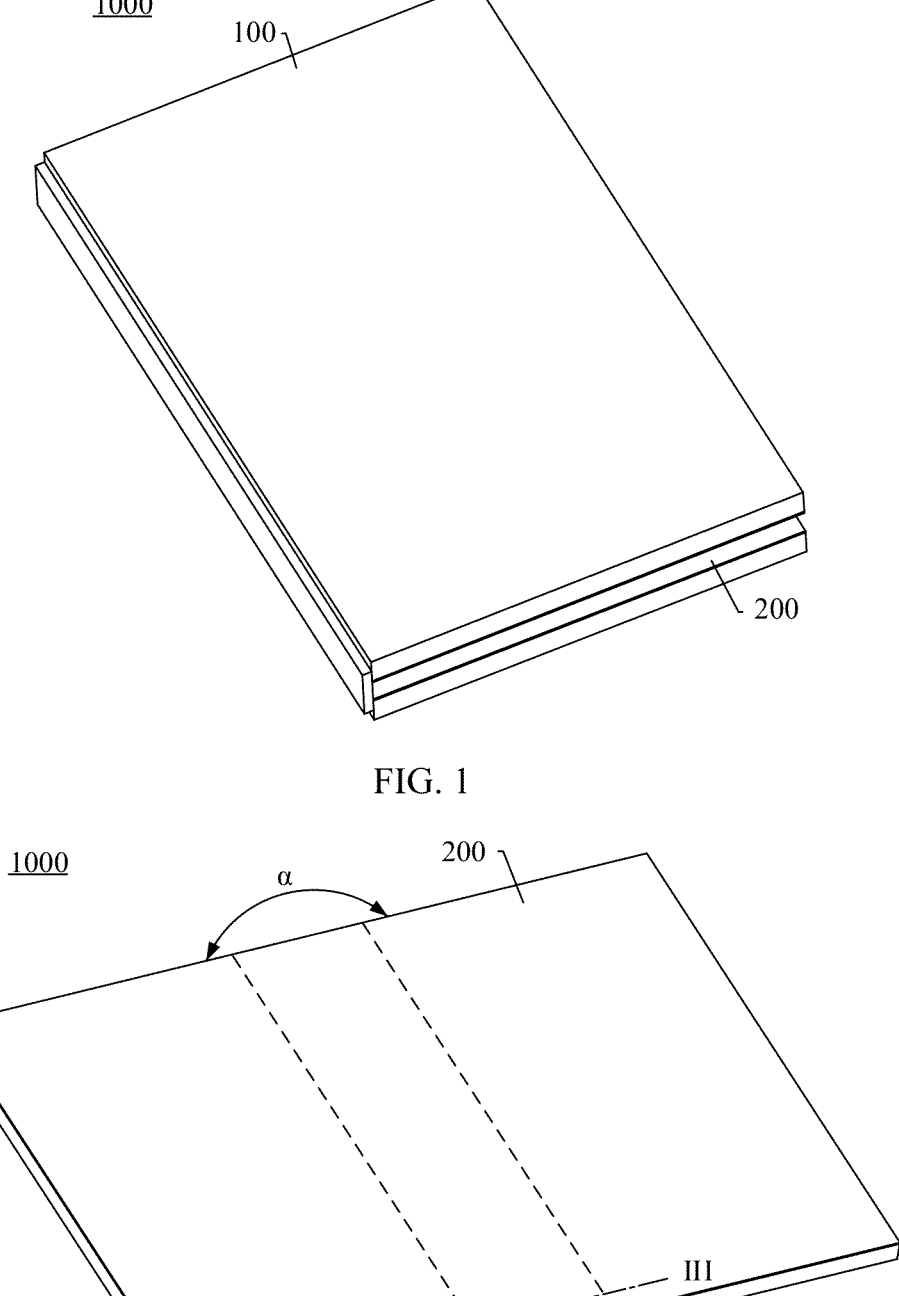
FIG. 1 is a schematic diagram of a structure of a foldable terminal in a first state according to an embodiment of this application.
FIG. 2 is a schematic diagram of a structure of the foldable terminal shown in FIG. 1 in a second state.

Referring to FIG. 1 and FIG. 2, FIG. 1 is a schematic diagram of a structure of a foldable terminal 1000 in a first state according to an embodiment of this application; and FIG. 2 is a schematic diagram of a structure of the foldable terminal 1000 shown in FIG. 1 in a second state.

For ease of description, a width direction of the foldable terminal 1000 shown in FIG. 2 is defined as an X-axis direction, a length direction of the foldable terminal 1000 is defined as a Y-axis direction, and a thickness direction of the foldable terminal 1000 is defined as a Z-axis direction. The X-axis direction, the Y-axis direction, and the Z-axis direction are perpendicular to each other.

The foldable terminal 1000 may be a foldable electronic product such as a mobile phone, a tablet computer, a personal computer, a multimedia player, an e-book reader, a notebook computer, a vehicle-mounted device, or a wearable device. In this embodiment, the foldable terminal 1000 is a foldable phone. That is, the foldable terminal 1000 is a mobile phone that can be switched between a folded state and an unfolded state. In this embodiment of this application, an example in which the foldable terminal 1000 can be folded or unfolded in the X-axis direction is used for description.

The foldable terminal 1000 shown in FIG. 1 is in a folded state, and the foldable terminal 1000 shown in FIG. 2 is in an unfolded state. For example, an unfolding angle α of the foldable terminal 1000 shown in FIG. 2 is 180°. That is, the foldable terminal 1000 shown in FIG. 2 is in a flattened state.

It should be noted that the angle illustrated in this embodiment of this application is allowed to have a little deviation. For example, that the unfolding angle α of the foldable terminal 1000 shown in FIG. 2 is 1800 means that α may be 1800 or about 180°, such as 170°, 175°, 1850 or 190°. The angle illustrated later can be understood in the same way.

It should be understood that the foldable terminal 1000 shown in this embodiment of this application is a terminal that can be folded once. In some other embodiments, the foldable terminal 1000 may be a terminal that can be folded for multiple times (twice or more). In this case, the foldable terminal 1000 may include a plurality of parts, two adjacent parts may be folded relatively close to each other until the foldable terminal 1000 in the folded state, or two adjacent parts may be unfolded relatively away from each other until the foldable terminal 1000 in the unfolded state.

Figure 3:
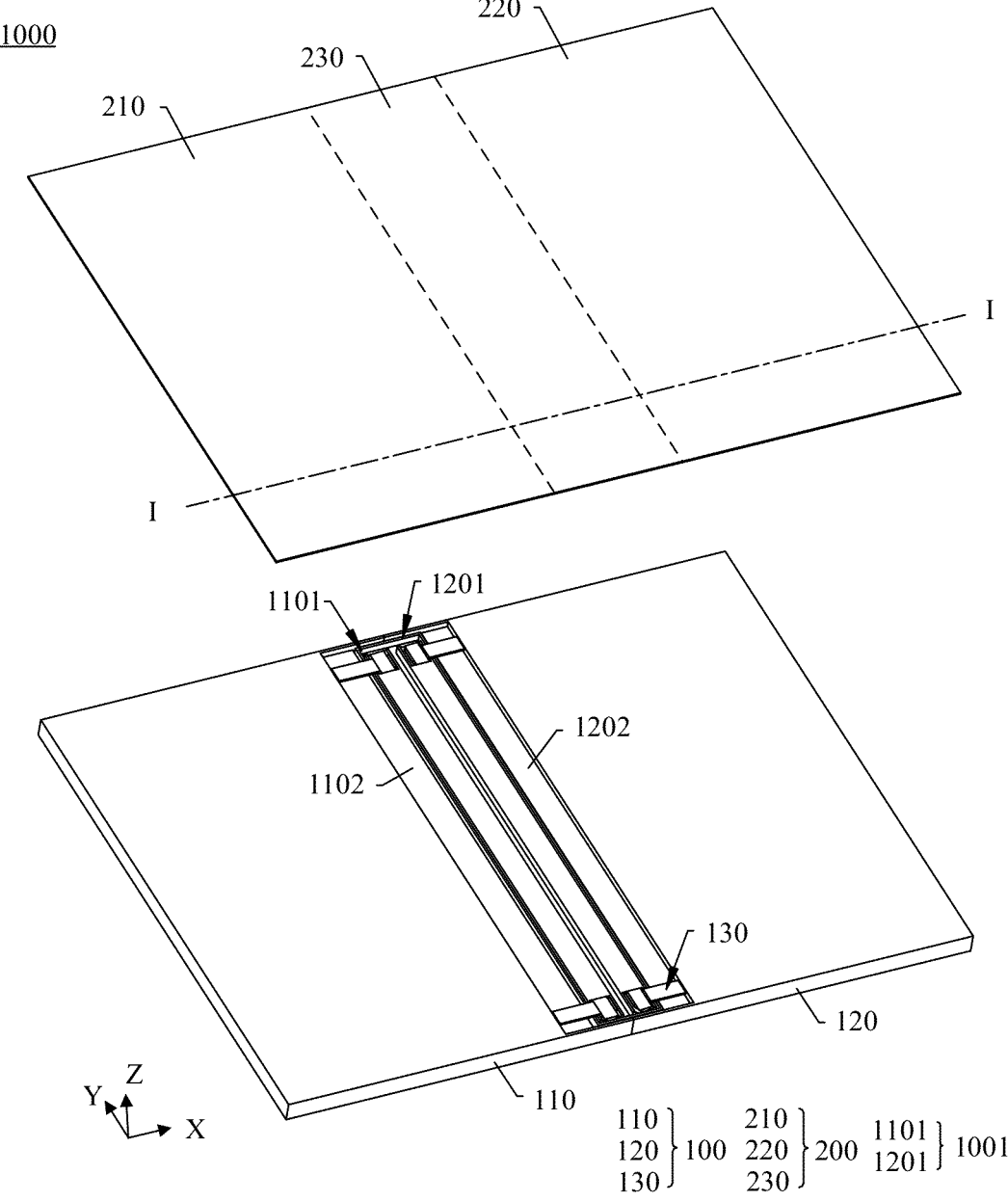
FIG. 3 is an exploded view of a structure of the foldable terminal shown in FIG. 2.

Also referring to FIG. 3, FIG. 3 is an exploded view of a structure of the foldable terminal 1000 shown in FIG. 2.

The foldable terminal 1000 includes a foldable apparatus 100 and a display 200. The display 200 is mounted on the foldable apparatus 100, and is configured to display information such as text, images, or videos. In this embodiment, the display 200 includes a first display part 210, a second display part 220, and a bendable part 230, and the bendable part 230 is connected between the first display part 210 and the second display part 220. The bendable portion 230 may be bent in the X-axis direction.

As shown in FIG. 1, when the foldable terminal 1000 is in a folded state, the first display part 210 and the second display part 220 are oppositely disposed, and the bendable part 230 is bent. In this case, the display 200 is in a folded state, and an exposed area of the display 200 is small, so as to greatly reduce a probability of damage to the display 200, and effectively protect the display 200. As shown in FIG. 2, the foldable terminal 1000 is in an unfolded state, the first display part 210 and the second display part 220 are relatively unfolded, and the bendable part 230 is flattened without bending. In this case, included angles between the first display part 210, the second display part 220, and the bendable part 230 are all α, and the display 200 has a large display area to implement large-screen display of the foldable terminal 1000 and improve user experience.

In this embodiment, the foldable apparatus 100 includes a first housing 110, a second housing 120, and a rotating mechanism 130. The rotating mechanism 130 is connected between the first housing 110 and the second housing 120 to implement a rotatable connection between the first housing 110 and the second housing 120. Specifically, the first housing 110 carries the first display part 210, and the second housing 120 carries the second display part 220. In other words, the first display part 210 is mounted on the first housing 110, and the second display part 220 is mounted on the second housing 120. The rotating mechanism 130 is disposed opposite to the bendable part 230.

The first housing 110 and the second housing 120 may be relatively rotated by using the rotating mechanism 130, so that the foldable apparatus 100 can be switched between a folded state and an unfolded state. Specifically, the first housing 110 and the second housing 120 may be relatively rotated to be oppositely disposed, so as to allow the foldable apparatus 100 to be in a folded state, as shown in FIG. 1. The first housing 110 and the second housing 120 may alternatively be relatively rotated to be relatively unfolded, so as to allow the foldable apparatus 100 to be in an unfolded state, as shown in FIG. 2. For example, the foldable terminal 1000 shown in FIG. 2 is in an unfolded state, and an included angle between the first housing 110 and the second housing 120 is u.

The first housing 110 is provided with a first accommodating groove 1101, and the first accommodating groove 1101 is located on one side that is of the first housing 110 and that faces the second housing 120. An opening of the first accommodating groove 1101 is located on a top surface of the first housing 110. The first accommodating groove 1101 is recessed in a direction from the top surface to a bottom surface of the first housing 110, and runs through a side face that is of the first housing 110 and that faces the second housing 120. A first step 1102 protrudes from a bottom wall of the first accommodating groove 1101, and a step surface of the first step 1102 is located between the top surface of the first housing 110 and the bottom wall of the first accommodating groove 1101.

The second housing 120 and the first housing 110 have a same structure and are mirror-symmetrical with respect to the rotating mechanism 130. The second housing 120 is provided with a second accommodating groove 1201, and the second accommodating groove 1201 is located on one side that is of the second housing 120 and that faces the first housing 110. An opening of the second accommodating groove 1201 is located on a top surface of the second housing 120. The second accommodating groove 1201 is recessed in a direction from the top surface to a bottom surface of the second housing 120, and runs through a side face that is of the second housing 120 and that faces the first housing 110. A second step 1202 protrudes from a bottom wall of the second accommodating groove 1201, and a step surface of the second step 1202 is located between the top surface of the second housing 120 and the bottom wall of the second accommodating groove 1201. As shown in FIG. 3, when the foldable apparatus 100 is in a flattened state, that is, when the included angle between the first housing 110 and the second housing 120 is u, the first accommodating groove 1101 and the second accommodating groove 1201 enclose to form an accommodating space 1001, and the rotating mechanism 130 is accommodated in the accommodating space 1001.

It should be noted that orientation words such as "top" and "bottom" used in this embodiment of this application to describe the foldable terminal 1000 are mainly described based on a display orientation of the foldable terminal 1000 shown in FIG. 2, with the "top" facing a positive direction of a Z axis and the "bottom" facing a negative direction of the Z axis, which does not limit an orientation of the foldable terminal 1000 in an actual application scenario.

Figure 4:
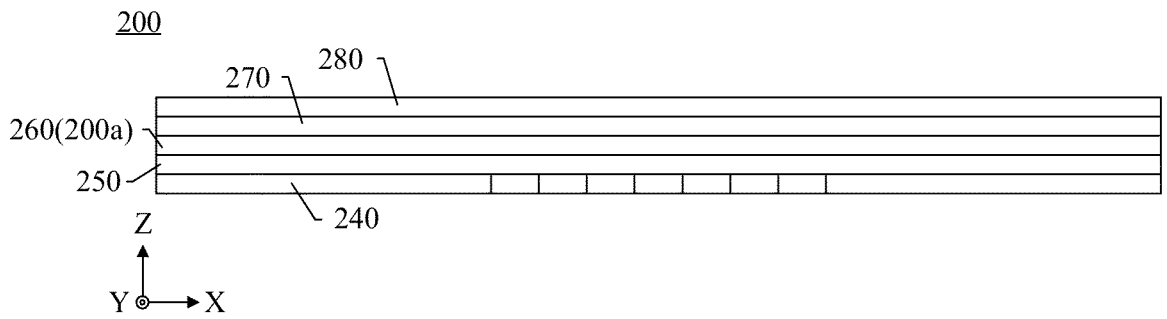
FIG. 4 is a schematic diagram of a sectional structure of a display of the foldable terminal shown in FIG. 3 taken along I-I.

Referring to FIG. 4, FIG. 4 is a schematic diagram of a sectional structure of a display 200 of the foldable terminal 1000 shown in FIG. 3 taken along I-I. It should be noted that, in accompanying drawings of this application, "taken along I-I" means taken along a plane where an I-I line is located, and the following description of accompanying drawings may be understood in a same way.

In this embodiment, the display 200 includes five structural layers, and the five structural layers are laminated. The five structural layers are a first structural layer 240, a second structural layer 250, a third structural layer 260, a fourth structural layer 270, and a fifth structural layer 280. The second structural layer 250, the third structural layer 260, the fourth structural layer 270, and the fifth structural layer 280 are sequentially laminated on a top surface of the first structural layer 240. In some other embodiments, the display 200 may further include two, three, four or more than five structural layers, which is not specifically limited in this application.

Specifically, the first structural layer 240 is a substrate layer, the second structural layer 250 is a display functional layer, the third structural layer 260 is a polarizer, the fourth structural layer 270 is a bonding layer, and the fifth structural layer 280 is a protective layer. The substrate layer is a structural layer with a support function in the display 200. For example, the substrate layer may be a steel sheet substrate. In some other embodiments, the substrate layer may include one or more support structural layers (not shown in the figure), and each support structural layer may be made of foam, polyimide (PI, polyimide), or a metal support plate, so that the substrate layer has some strength and rigidity to support the display functional layer.

The display functional layer is a structural layer with a display function in the display 200. The polarizer is laminated on a top surface of the display functional layer. Because the substrate layer, the display functional layer, and the polarizer are made of different materials, stretching deformation amounts of the substrate layer, the display functional layer, and the polarizer vary during folding of the foldable terminal 1000. A stretching deformation amount of the substrate layer is greater than that of the display functional layer, and a stretching deformation amount of the display functional layer is greater than that of the polarizer. That is, a stretching deformation amount of the first structural layer 240 is greater than that of the second structural layer 250, and a stretching deformation amount of the second structural layer 250 is greater than that of the third structural layer 260.

The protective layer is a structural layer with a protection function in the display 200. The protective layer is located on a top side of the polarizer, and the bonding layer is connected between the protective layer and the polarizer. The protective layer may protect the display functional layer. The bonding layer may be a double-sided adhesive, a top surface of the bonding layer is bonded to a bottom surface of the protective layer, and a bottom surface of the bonding layer is bonded to a top surface of the polarizer.

In addition, the display 200 includes a neutral layer 200a, and the neutral layer 200a may include one or more structural layers. In this embodiment, the neutral layer 200a includes a third structural layer 260. In some other embodiments, the neutral layer 200a may further include the second structural layer 250, or the neutral layer 200a may further include the second structural layer 250 and the third structural layer 260.

It should be noted that because the display 200 is of a multilayer laminated structure, and the structural layers are made of different materials, stretching deformation amounts of the structural layers also vary. During folding of the foldable terminal 1000, some structural layers are stretched, and some structural layers are compressed. During folding of the foldable terminal 1000, the neutral layer 200a is a layer structure that is neither stretched nor compressed in the display 200, or the neutral layer 200a is a layer structure that has a small stretching deformation amount and a small compression deformation amount in the display 200.

Figure 5:
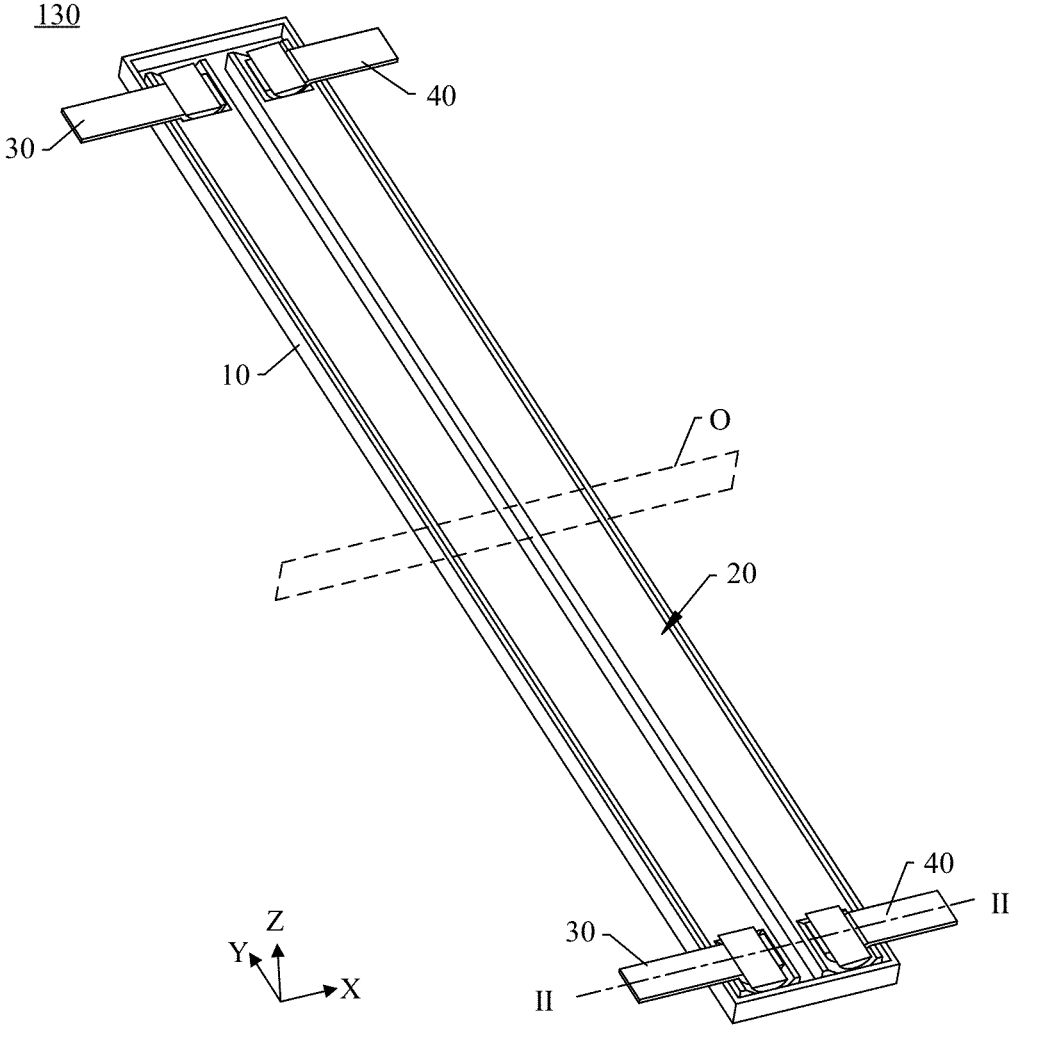
FIG. 5 is a schematic diagram of a structure of a rotating mechanism of the foldable terminal shown in FIG. 3.
Figure 6:
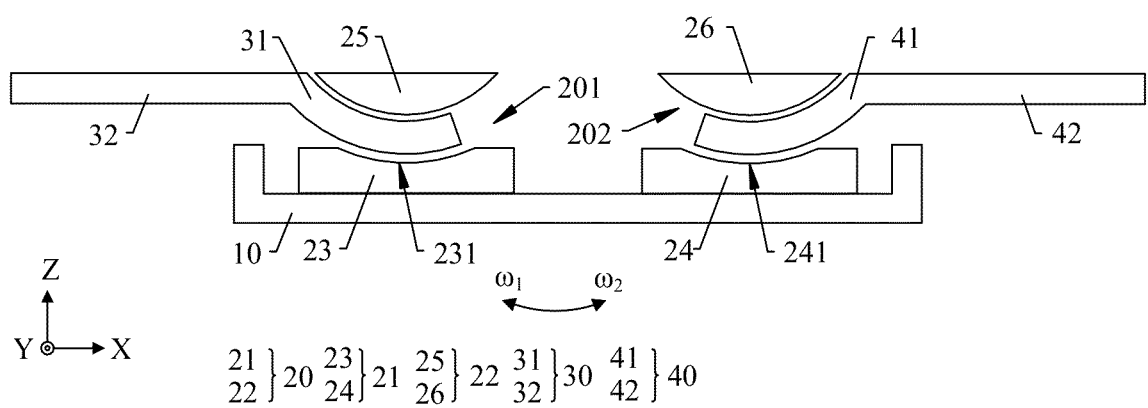
FIG. 6 is a schematic diagram of a sectional structure of the rotating mechanism shown in FIG. 5 taken along II-II.

Referring to FIG. 5 and FIG. 6, FIG. 5 is a schematic diagram of a structure of a rotating mechanism 130 of the foldable terminal 1000 shown in FIG. 3; and FIG. 6 is a schematic diagram of a sectional structure of the rotating mechanism 130 shown in FIG. 5 taken along II-II.

In this embodiment, the rotating mechanism 130 has a symmetry plane O, and the rotating mechanism 130 is mirror-symmetrical with respect to the symmetry plane O to ensure rotation stability of the rotating mechanism 130. In some other embodiments, the rotating mechanism 130 may alternatively not have the symmetry plane O. Whether the rotating mechanism 130 has symmetry is not specifically limited in this application. Specifically, the rotating mechanism 130 includes a housing 10, a limit base 20, a first swing arm 30, and a second swing arm 40. The limit base 20, the first swing arm 30, and the second swing arm 40 are mounted on an inner side of the housing 10. The limit base 20 is provided with a first arc-shaped groove 201 and a second arc-shaped groove 202. The first swing arm 30 is slidably mounted in the first arc-shaped groove 201 and may rotate with respect to the limit base 20. The second swing arm 40 is slidably mounted in the second arc-shaped groove 202, and may rotate with respect to the limit base 20.

The first swing arm 30 and the second swing arm 40 rotate in opposite directions with respect to the limit base 20. For example, the first swing arm 30 rotates clockwise (a oi direction shown in the figure) with respect to the limit base 20, and the second swing arm 40 rotates counterclockwise (a $\omega_2$ direction shown in the figure) with respect to the limit base 20. In this case, the first swing arm 30 and the second swing arm 40 rotate with respect to the limit base 20 to be relatively folded. Alternatively, the first swing arm 30 rotates counterclockwise with respect to the limit base 20, and the second swing arm 40 rotates clockwise with respect to the limit base 20. In this case, the first swing arm 30 and the second swing arm 40 rotate with respect to the limit base 20 to be relatively unfolded.

For example, the limit base 20 is provided with two first arc-shaped grooves 201 and two second arc-shaped grooves 202. The rotating mechanism 130 includes two first swing arms 30 and two second swing arms 40. The two first arc-shaped grooves 201 are spaced apart from each other in the Y-axis direction, and the two second arc-shaped grooves 202 are spaced apart from each other in the Y-axis direction. The two first swing arms 30 are slidably mounted in the two first arc-shaped grooves 201 respectively, and are spaced apart from each other in the Y-axis direction. The two second swing arms 40 are slidably mounted in the two second arc-shaped grooves 202 respectively, and are spaced apart from each other in the Y-axis direction. In some other embodiments, a quantity of the first arc-shaped groove 201, the second arc-shaped groove 202, the first swing arm 30, and the second swing arm 40 may alternatively be one or more than three respectively, which is not specifically limited in this embodiment of this application.

In this embodiment, the limit base 20 includes a lower limit block 21 and an upper limit block 22, and the upper limit block 22 is mounted on the lower limit block 21 and encloses with the lower limit block 21 to form the first arc-shaped groove 201 and the second arc-shaped groove 202. Specifically, the lower limit block 21 includes a first lower limit block 23 and a second lower limit block 24. In the X-axis direction, the first lower limit block 23 and the second lower limit block 24 are spaced apart from each other. The upper limit block 22 includes a first upper limit block 25 and a second upper limit block 26. The first upper limit block 25 is mounted on the first lower limit block 23, and encloses with the first lower limit block 23 to form the first arc-shaped groove 201. The second upper limit block 26 is mounted on the second lower limit block 24, and encloses with the second lower limit block 24 to form the second arc-shaped groove 202. In the X-axis direction, the first arc-shaped groove 201 and the second arc-shaped groove 202 are spaced apart from each other. The first arc-shaped groove 201 and the second arc-shaped groove 202 are all arranged in an overlapped manner in the Y-axis direction.

It should be noted that arrangement in an overlapped manner means that projections are overlapped. For example, that the first arc-shaped groove 201 and the second arc-shaped groove 202 are all arranged in an overlapped manner in the Y-axis direction means that projections of the first arc-shaped groove 201 and the second arc-shaped groove 202 on a Y-Z axis plane are all overlapped. The following description of arrangement in an overlapped manner may be understood in a same way.

In some other embodiments, the first arc-shaped groove 201 and the second arc-shaped groove 202 may alternatively be arranged in an overlapped manner in the X-axis direction, so as to reduce a size of the rotating mechanism 130 in the X-axis direction. Alternatively, the first arc-shaped groove 201 and the second arc-shaped groove 202 may be spaced apart from each other in the Y-axis direction.

The first lower limit block 23 is provided with a first chute 231, and an opening of the first chute 231 is located on a top surface of the first lower limit block 23. The first chute 231 is recessed in a direction from the top surface to a bottom surface of the first lower limit block 23. The first chute 231 is a circular arc chute, and a bottom wall of the first chute 231 is a circular arc surface. For example, there are two first chutes 231, and the two first chutes 231 are spaced apart from each other in the Y-axis direction.

The first upper limit block 25 is mounted on a top side of the first chute 231. A bottom surface of the first upper limit block 25 is an arc-shaped surface matching the bottom wall of the first chute 231, so that the first upper limit block 25 encloses with the first lower limit block 23 to form the first arc-shaped groove 201. An axle center of the bottom surface of the first upper limit block 25 coincides with an axle center of the bottom wall of the first chute 231. For example, there are two first upper limit blocks 25, and the two first upper limit blocks 25 are spaced apart from each other in the Y-axis direction. The two first upper limit blocks 25 are respectively mounted on top sides of the two first chutes 231, and respectively enclose with the two first chutes 231 to form two first arc-shaped grooves 201.

In some other embodiments, the two first upper limit blocks 25 may be integrally formed with the first lower limit block 23, or the two first upper limit blocks 25 may be assembled with the first lower limit block 23 to form an integrated structure, so as to enhance an overall strength of the rotating mechanism 130.

The second lower limit block 24 is provided with a second chute 241, and an opening of the second chute 241 is located on a top surface of the second lower limit block 24. The second chute 241 is recessed in a direction from the top surface to a bottom surface of the second lower limit block 24. The second chute 241 is a circular arc chute, and a bottom wall of the second chute 241 is an arc-shaped surface. For example, there are two second chutes 241, and the two second chutes 241 are spaced apart from each other in the Y-axis direction.

The second upper limit block 26 is mounted on a top side of the second chute 241. A bottom surface of the second upper limit block 26 is an arc-shaped surface matching the bottom wall of the second chute 241, so that the second upper limit block 26 encloses with a second lower limit block 24 to form the second arc-shaped groove 202. An axle center of the bottom surface of the second upper limit block 26 coincides with an axle center of the bottom wall of the second chute 241. For example, there are two second upper limit blocks 26, and the two second upper limit blocks 26 are spaced apart from each other in the Y-axis direction. The two second upper limit blocks 26 are respectively mounted on top sides of the two second chutes 241, and respectively enclose with the two second chutes 241 to form two second arc-shaped grooves 202.

In some other embodiments, the two second upper limit blocks 26 may be integrally formed with the second lower limit block 24, or the two second upper limit blocks 26 may be assembled with the second lower limit block 24 to form an integrated structure, so as to enhance an overall strength of the rotating mechanism 130.

The first swing arm 30 includes a first rotating shaft portion 31 and a first swing portion 32, the first rotating shaft portion 31 is located at one end of the first swing arm 30, and the first swing portion 32 is located on one side of the first rotating shaft portion 31 and is fixedly connected to the first rotating shaft portion 31. The first rotating shaft portion 31 is in a shape of a circular arc plate, and the first swing portion 32 is in a shape of a flat plate. The first rotating shaft portion 31 protrudes in a direction away from a top surface of the first swing portion 32, and matches the first arc-shaped groove 201.

Specifically, the first rotating shaft portion 31 is slidably mounted in the first arc-shaped groove 201, and may rotate with respect to the limit base 20. The first rotating shaft portion 31 is clamped between the first lower limit block 23 and the first upper limit block 25. That is, in the Z-axis direction, the first lower limit block 23 and the first upper limit block 25 jointly limit the first rotating shaft portion 31, to prevent the first rotating shaft portion 31 from sliding from the first arc-shaped groove 201, so as to ensure rotation reliability of the first rotating shaft portion 31 with respect to the limit base 20, and then ensure use reliability of the rotating mechanism 130.

It should be noted that, that the first rotating shaft portion 31 matches the first arc-shaped groove 201 means that the first rotating shaft portion 31 may slide in the first arc-shaped groove 201, to implement relative rotation between the first rotating shaft portion 31 and the limit base 20. The following description of matching may be understood in a same way.

The first swing portion 32 extends relative to the first arc-shaped groove 201. The first swing portion 32 extends relative to a left side of the first lower limit block 23. When rotating with respect to the limit base 20, the first swing portion 32 drives the first rotating shaft portion 31 to slide in the first arc-shaped groove 201, so that the first rotating shaft portion 31 rotates with respect to the limit base 20, and then the first swing arm 30 rotates with respect to the limit base 20.

In this embodiment, a structure of the second swing arm 40 is roughly the same as that of the first swing arm 30. The second swing arm 40 includes a second rotating shaft portion 41 and a second swing portion 42, the second rotating shaft portion 41 is located at one end of the second swing arm 40, and the second swing portion 42 is located on one side of the second rotating shaft portion 41 and is fixedly connected to the second rotating shaft portion 41. The second rotating shaft portion 41 is in a shape of a circular arc plate, and the second swing portion 42 is in a shape of a flat plate. The second rotating shaft portion 41 protrudes in a direction away from a top surface of the second swing portion 42, and matches the second arc-shaped groove 202.

Specifically, the second rotating shaft portion 41 is slidably mounted in the second arc-shaped groove 202, and may rotate with respect to the limit base 20. The second rotating shaft portion 41 is clamped between the second lower limit block 24 and the second upper limit block 26. That is, in the Z-axis direction, the second lower limit block 24 and the second upper limit block 26 jointly limit the second rotating shaft portion 41, to prevent the second rotating shaft portion 41 from sliding from the second arc-shaped groove 202, so as to ensure rotation reliability of the second rotating shaft portion 41 with respect to the limit base 20, and then ensure use reliability of the rotating mechanism 130.

The second swing portion 42 extends relative to the second arc-shaped groove 202. The second swing portion 42 extends relative to a right side of the second lower limit block 24. When rotating with respect to the limit base 20, the second swing portion 42 drives the second rotating shaft portion 41 to slide in the second arc-shaped groove 202, so that the second rotating shaft portion 41 rotates with respect to the limit base 20, and then the second swing arm 40 rotates with respect to the limit base 20.

In this case, the included angle between the second swing portion 42 and the first swing portion 32 is u. In the X-axis direction, the first rotating shaft portion 31 and the second rotating shaft portion 41 are spaced apart. The first rotating shaft portion 31 and the second rotating shaft portion 41 are all arranged in an overlapped manner in the Y-axis direction, so as to reduce a size of the rotating mechanism 130 in the Y-axis direction, and implement a miniaturization design of the rotating mechanism 130.

In some other embodiments, the first rotating shaft portion 31 and the second rotating shaft portion 41 may alternatively be partially or completely overlapped in the X-axis direction, so as to reduce a size of the rotating mechanism 130 in the X-axis direction, and implement a miniaturization design of the rotating mechanism 130. Alternatively, the first rotating shaft portion 31 and the second rotating shaft portion 41 may be partially overlapped or spaced apart in the Y-axis direction, which is not specifically limited in this application.

Figure 7:
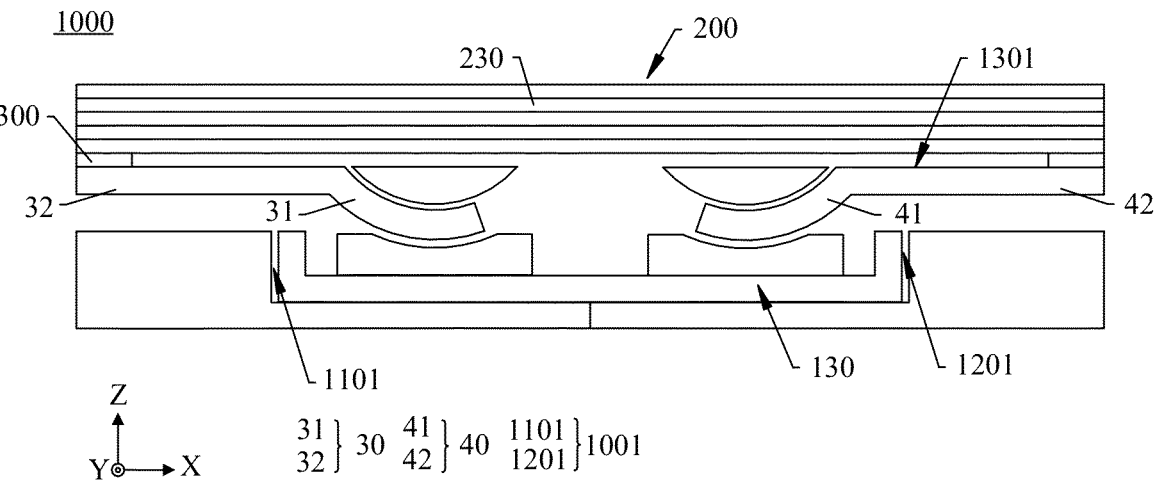
FIG. 7 is a schematic diagram of a sectional structure of the foldable terminal shown in FIG. 2 taken along III-III.

Referring to FIG. 3 and FIG. 7, FIG. 7 is a schematic diagram of a sectional structure of the foldable terminal 1000 shown in FIG. 2 taken along III-III.

When the foldable apparatus 100 is in a flattened state, the rotating mechanism 130 is mounted in the accommodating space 1001. A part of the rotating mechanism 130 is mounted in the first accommodating groove 1101 of the first housing 110, and another part of the rotating mechanism 130 is mounted in the second accommodating groove 1201 of the second housing 120. Specifically, the first swing arm 30 is fixedly connected to the first housing 110, and the second swing arm 40 is fixedly connected to the second housing 120. The first swing portion 32 is fixedly connected to the first housing 110, and the second swing portion 42 is fixedly connected to the second housing 120. For example, the first swing arm 30 may be fixedly connected to the first housing 110 by using a screw or a bolt, and the second swing arm 40 may be fixedly connected to the second housing 120 by using a screw or a bolt. When the first housing 110 and the second housing 120 are relatively folded or unfolded, the first housing 110 drives the first swing arm 30 to rotate with respect to the limit base 20, and the second housing 120 drives the second swing arm 40 to rotate with respect to the limit base 20.

In this case, the top surface of the first swing portion 32 is flush with the top surface of the second swing portion 42. The top surface of the first swing portion 32 and the top surface of the second swing portion 42 jointly form a support surface 1301, and the support surface 1301 may support the bendable part 230 of the display 200 to ensure good display of the display 200. For example, the bendable part 230 may be mounted on the support surface 1301 by using a bonding layer 300. The top surface of the first swing portion 32 is flush with the top surface of the first housing 110, and the top surface of the second swing portion 42 is flush with the top surface of the second housing 120, so that the first swing portion 32 and the second swing portion 42 may support the display 200 together with the first housing 110 and the second housing 120. Therefore, the foldable apparatus 100 in a flattened state can effectively support the display 200.

In addition, the rotating mechanism 130 may further include a transmission member (not shown in the figure), and the transmission member is connected between the first swing arm 30 and the second swing arm 40 to drive the second swing arm 40 to rotate with respect to the limit base 20 while the first swing arm 30 rotates with respect to the limit base 20, or to drive the first swing arm 30 to rotate with respect to the limit base 20 while the second swing arm 40 rotates with respect to the limit base 20, so as to implement synchronous rotation of the first swing arm 30 and the second swing arm 40 with respect to the limit base 20. For example, the transmission member may be a gear or another component that can implement transmission.

It should be noted that, in an existing rotating mechanism, rotating shaft portions of swing arms are in a shape of a continuous arc-shaped plate. During folding or unfolding of the rotating mechanism, a rotation process of each swing arm cannot match a bending process of a display, and the rotating mechanism tends to stretch the display, resulting in wrinkles on the display under a stress, which affects use reliability of the foldable terminal.

In the rotating mechanism 130 shown in this embodiment of this application, the first rotating shaft portion 31 and the second rotating shaft portion 41 are designed to be in a shape of a discontinuous arc-shaped plate. During folding of the foldable terminal 1000, rotation processes of the first swing arm 30 and the second swing arm 40 with respect to the limit base 20 can match a bending process of the display 200, so as to prevent the rotating mechanism 130 from stretching the display 200, and avoid the problem that the display 200 has wrinkles under a stress, thereby ensuring use reliability of the foldable terminal 1000.

Next, structures of the first swing arm 30 and the second swing arm 40 of the rotating mechanism 130 shown in this embodiment of this application are described in detail.

Figure 8:
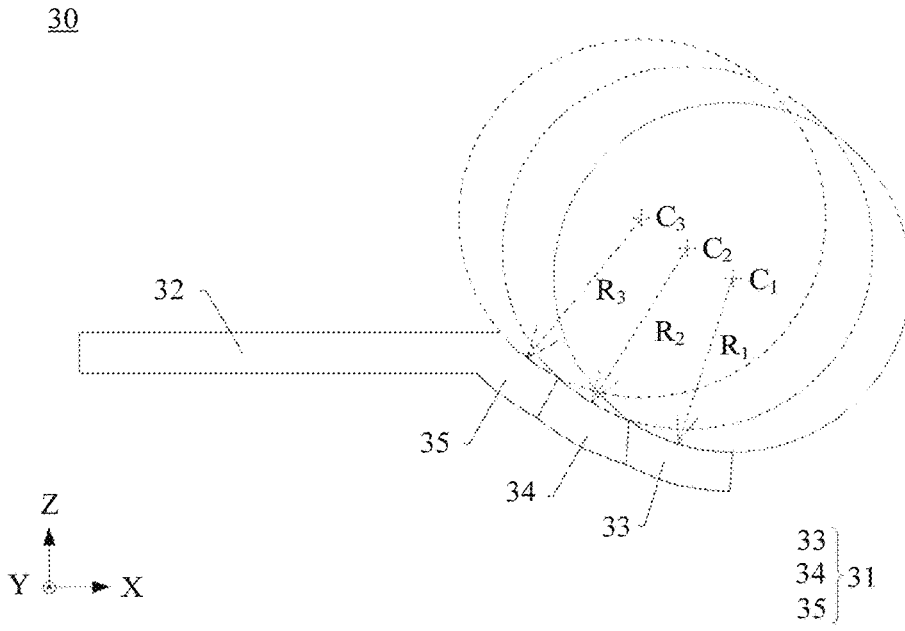
FIG. 8 is a schematic diagram of a structure of a first swing arm of the foldable terminal shown in FIG. 7 according to a first implementation.

Referring to FIG. 8, FIG. 8 is a schematic diagram of a structure of a first swing arm 30 of the foldable terminal 1000 shown in FIG. 7 according to a first implementation.

The first rotating shaft portion 31 includes three arc-shaped parts distributed in a circumferential direction of the first rotating shaft portion 31, and the three arc-shaped parts are sequentially connected. The three arc-shaped parts are a first arc-shaped part 33, a second arc-shaped part 34, and a fifth arc-shaped part 35. The first arc-shaped part 33 is located at one end that is of the first rotating shaft portion 31 and that is away from the first swing portion 32; the fifth arc-shaped part 35 is located at one end that is of the first rotating shaft portion 31 and that is close to the first swing portion 32, and is fixedly connected to the first swing portion 32; and the second arc-shaped part 34 is connected between the first arc-shaped part 33 and the fifth arc-shaped part 35. In some other implementations, the first rotating shaft portion 31 may further include two or more than four arc-shaped parts, which is not specifically limited in this application.

In this implementation, an axle center of the first arc-shaped part 33 is $C_1$, and the first arc-shaped part 33 has a radius of $R_1$. An axle center of the second arc-shaped part 34 is $C_2$, and the second arc-shaped part 34 has a radius of $R_2$. An axle center of the fifth arc-shaped part 35 is $C_3$, and the fifth arc-shaped part 35 has a radius of $R_3$. Specifically, the axle center $C_1$ of the first arc-shaped part 33, the axle center $C_2$ of the second arc-shaped part 34, and the axle center $C_3$ of the fifth arc-shaped part 35 are spaced apart from each other. That is, the axle center $C_1$ of the first arc-shaped part 33, the axle center $C_2$ of the second arc-shaped part 34, and the axle center $C_3$ of the fifth arc-shaped part 35 do not coincide. The axle center $C_1$ of the first arc-shaped part 33 and the axle center $C_2$ of the second arc-shaped part 34 are located at a bottom side of the axle center $C_3$ of the fifth arc-shaped part 35, and the axle center $C_1$ of the first arc-shaped part 33 is located at a bottom side of the axle center $C_2$ of the second arc-shaped part 34.

In some other implementations, the axle center $C_2$ of the second arc-shaped part 34 may alternatively be located at a bottom side of the axle center $C_1$ of the first arc-shaped part 33. Alternatively, the axle center $C_1$ of the first arc-shaped part 33 and the axle center $C_3$ of the fifth arc-shaped part 35 may be located at the bottom side of the axle center $C_2$ of the second arc-shaped part 34, and the axle center $C_3$ of the fifth arc-shaped part 35 is located at the bottom side of the axle center $C_1$ of the first arc-shaped part 33, or the axle center $C_1$ of the first arc-shaped part 33 is located at the bottom side of the axle center $C_3$ of the fifth arc-shaped part 35. Alternatively, the axle center $C_2$ of the second arc-shaped part 34 and the axle center $C_3$ of the fifth arc-shaped part 35 may be located at the bottom side of the axle center $C_1$ of the first arc-shaped part 33, and the axle center $C_2$ of the second arc-shaped part 34 is located at the bottom side of the axle center $C_3$ of the fifth arc-shaped part 35, or the axle center $C_3$ of the fifth arc-shaped part 35 is located at the bottom side of the axle center $C_2$ of the second arc-shaped part 34.

In addition, a radius $R_1$ of the first arc-shaped part 33, a radius $R_2$ of the second arc-shaped part 34, and a radius $R_3$ of the fifth arc-shaped part 35 are equal. In some other implementations, the radius $R_1$ of the first arc-shaped part 33 may be equal to the radius $R_2$ of the second arc-shaped part 34, but not equal to the radius $R_3$ of the fifth arc-shaped part 35; or the radius $R_1$ of the first arc-shaped part 33 may be equal to the radius $R_3$ of the fifth arc-shaped part 35, but not equal to the radius $R_2$ of the second arc-shaped part 34; or the radius $R_2$ of the second arc-shaped part 34 may be equal to the radius $R_3$ of the fifth arc-shaped part 35, but not equal to the radius $R_1$ of the first arc-shaped part 33; or the radius $R_1$ of the first arc-shaped part 33, the radius $R_2$ of the second arc-shaped part 34, and the radius $R_3$ of the fifth arc-shaped part 35 are not equal.

Figure 9:
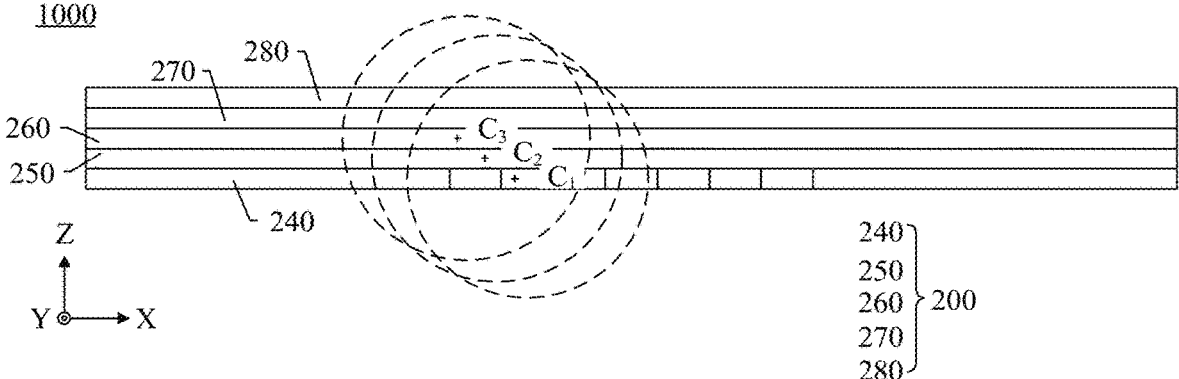
FIG. 9 is a schematic diagram of a partial structure of the foldable terminal shown in FIG. 7 according to the first implementation.

Referring to FIG. 7 and FIG. 9, FIG. 9 is a schematic diagram of a partial structure of the foldable terminal 1000 shown in FIG. 7 according to the first implementation. FIG. 9 shows only the display 200, the axle center $C_1$ of the first arc-shaped part 33, the axle center $C_2$ of the second arc-shaped part 34, and the axle center $C_3$ of the fifth arc-shaped part 35.

In this implementation, the axle center $C_1$ of the first arc-shaped part 33, the axle center $C_2$ of the second arc-shaped part 34, and the axle center $C_3$ of the fifth arc-shaped part 35 are located in the display 200. Specifically, the axle center $C_1$ of the first arc-shaped part 33, the axle center $C_2$ of the second arc-shaped part 34, and the axle center $C_3$ of the fifth arc-shaped part 35 are respectively located at different layers of the display 200. The axle center $C_1$ of the first arc-shaped part 33 is located at the third structural layer 260, the axle center $C_2$ of the second arc-shaped part 34 is located at the second structural layer 250, the axle center $C_1$ located in the first arc-shaped part 33 is away from one side of the second swing arm 40, the axle center $C_3$ of the fifth arc-shaped part 35 is located at the first structural layer 240, and the axle center $C_2$ located in the second arc-shaped part 34 is away from one side of the second swing arm 40.

In some other implementations, the axle center $C_1$ of the first arc-shaped part 33 may alternatively be located in the fifth structural layer 280, the fourth structural layer 270, the second structural layer 250, or the first structural layer 240 of the display 200; or the axle center $C_2$ of the second arc-shaped part 34 may be located in the fifth structural layer 280, the fourth structural layer 270, the third structural layer 260 or the first structural layer 240 of the display 200; or the axle center $C_3$ of the fifth arc-shaped part 35 may be located in the fifth structural layer 280, the fourth structural layer 270, the third structural layer 260 or the second structural layer 250 of the display 200, which is not specifically limited in this application.

In this implementation, a structure of the second swing arm 40 is roughly the same as that of the first swing arm 30. The second rotating shaft portion 41 includes three arc-shaped parts distributed in a circumferential direction of the second rotating shaft portion 41, and the three arc-shaped parts are sequentially connected. The three arc-shaped parts are a third arc-shaped part, a fourth arc-shaped part, and a sixth arc-shaped part (not shown in the figure). The third arc-shaped part is located at one end that is of the second rotating shaft portion 41 and that is away from the second swing portion 42; the sixth arc-shaped part is located at one end that is of the second rotating shaft portion 41 and that is close to the second swing portion 42, and is fixedly connected to the second swing portion 42; and the fourth arc-shaped part is connected between the third arc-shaped part and the sixth arc-shaped part.

Specifically, an axle center of the third arc-shaped part is located at the first structural layer 240, an axle center of the fourth arc-shaped part is located at the second structural layer 250, the axle center located in the third arc-shaped part is away from one side of the first swing arm 30, an axle center of the sixth arc-shaped part is located at the third structural layer 260, and the axle center located in the fourth arc-shaped part is away from one side of the first swing arm 30. It should be noted that a structure of the third arc-shaped part is roughly the same as that of the first arc-shaped part 33, a structure of the fourth arc-shaped part is roughly the same as that of the second arc-shaped part 34, and a structure of the sixth arc-shaped part is roughly the same as that of the fifth arc-shaped part 35. Therefore, for specific structures of the third arc-shaped part, the fourth arc-shaped part and the sixth arc-shaped part, reference may be made to foregoing descriptions of the first arc-shaped part 33, the second arc-shaped part 34 and the fifth arc-shaped part 35, and details are not described herein again.

In this implementation, because the axle center $C_1$ of the first arc-shaped part 33 is located at the first structural layer 240, the axle center $C_2$ of the second arc-shaped part 34 is located at the second structural layer 250, the axle center $C_1$ located in the first arc-shaped part 33 is away from one side of the second swing arm 40, the axle center $C_3$ of the fifth arc-shaped part 35 is located at the third structural layer 260, and the axle center $C_2$ located in the second arc-shaped part 34 is away from one side of the second swing arm 40, during folding of the foldable terminal 1000, a stretching deformation amount of the first structural layer 240 and a stretching deformation amount of the second structural layer 250 may be reduced to match a stretching deformation amount of the third structural layer 260, so that a degree of matching among the first structural layer 240, the second structural layer 250, and the third structural layer 260 may be improved. Therefore, rotation processes of the first swing arm 30 and the second swing arm 40 with respect to the limit base 20 can match a bending process of the display 200, so as to reduce stretching of the rotating mechanism 130 on the display 200, and avoid the problem that the display 200 has wrinkles due to stretching, thereby ensuring use reliability of the foldable terminal 1000.

Figure 10:
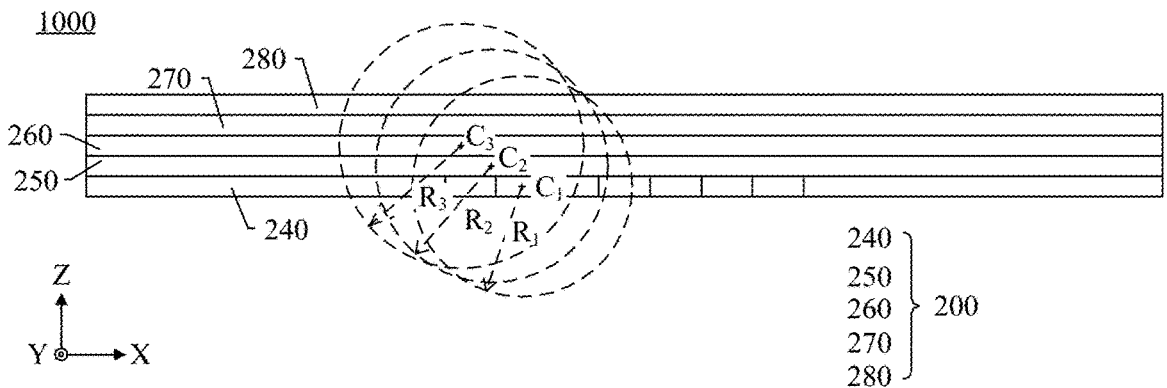
FIG. 10 is a schematic diagram of a partial structure of the foldable terminal shown in FIG. 7 according to a second implementation.

Referring to FIG. 7 and FIG. 10, FIG. 10 is a schematic diagram of a partial structure of the foldable terminal 1000 shown in FIG. 7 according to a second implementation. FIG. 10 shows only the display 200, the axle center $C_1$ of the first arc-shaped part 33, the radius $R_1$, the axle center $C_2$ of the second arc-shaped part 34, the radius $R_2$, the axle center $C_3$ of the fifth arc-shaped part 35, and the radius $R_3$.

The foldable terminal 1000 according to this implementation differs from the foldable terminal 1000 according to the first implementation in that the radius $R_1$ of the first arc-shaped part 33 is not equal to the radius $R_2$ of the second arc-shaped part 34, and the radius $R_2$ of the second arc-shaped part 34 is not equal to the radius $R_3$ of the fifth arc-shaped part 35. For example, the radius $R_1$ of the first arc-shaped part 33 is greater than the radius $R_2$ of the second arc-shaped part 34, and the radius $R_2$ of the second arc-shaped part 34 is greater than the radius $R_3$ of the fifth arc-shaped part 35.

A curvature of the first arc-shaped part 33 is designed to be tangent a curvature of the second arc-shaped part 34, that is, a difference between the radius $R_1$ of the first arc-shaped part 33 and the radius $R_2$ of the second arc-shaped part 34 is 0.1 mm~10 cm. A curvature of the second arc-shaped part 34 is designed to be tangent a curvature of the fifth arc-shaped part 35, that is, a difference between the radius $R_2$ of the second arc-shaped part 34 and the radius $R_3$ of the fifth arc-shaped part 35 is 0.1 mm~10 cm. The curvature of the second arc-shaped part 34 is designed to be tangent the curvature of the first arc-shaped part 33 and the curvature of the fifth arc-shaped part 35. Therefore, when the first rotating shaft portion 31 rotates with respect to the limit base 20, a amplitude of a curvature change can be reduced, and smoothness of rotation of the first rotating shaft portion 31 with respect to the limit base 20 can be ensured while avoiding stretching the display 200.

In this implementation, because the axle center $C_1$ of the first arc-shaped part 33 is located at the first structural layer 240, the axle center $C_2$ of the second arc-shaped part 34 is located at the second structural layer 250, the axle center $C_1$ located in the first arc-shaped part 33 is away from one side of the second swing arm 40, the axle center $C_3$ of the fifth arc-shaped part 35 is located at the third structural layer 260, and the axle center $C_2$ located in the second arc-shaped part 34 is away from one side of the second swing arm 40, during folding of the foldable terminal 1000, a stretching deformation amount of the first structural layer 240 and a stretching deformation amount of the second structural layer 250 may be reduced to match a stretching deformation amount of the third structural layer 260, so that a degree of matching among the first structural layer 240, the second structural layer 250, and the third structural layer 260 may be improved. Therefore, rotation processes of the first swing arm 30 and the second swing arm 40 with respect to the limit base 20 can match a bending process of the display 200, so as to reduce stretching of the rotating mechanism 130 on the display 200, and avoid the problem that the display 200 has wrinkles due to stretching, thereby ensuring use reliability of the foldable terminal 1000.

Figure 11:
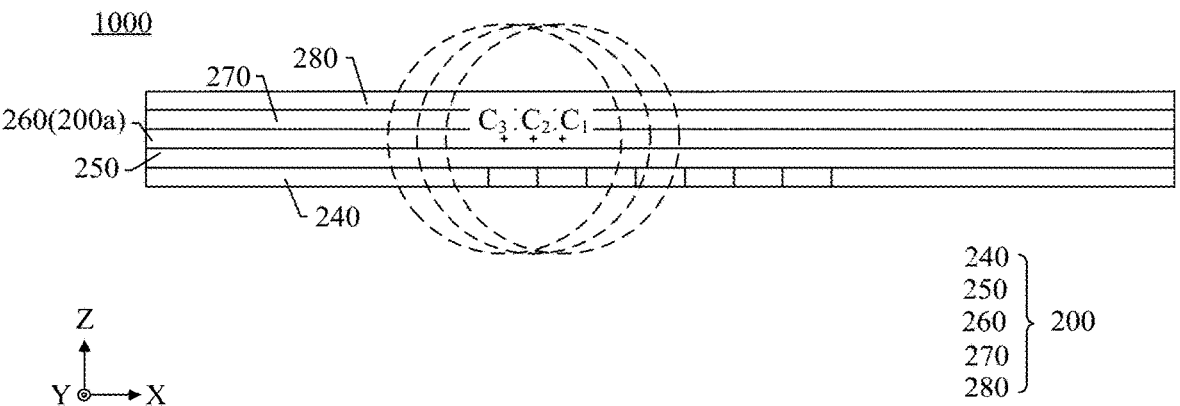
FIG. 11 is a schematic diagram of a partial structure of the foldable terminal shown in FIG. 7 according to a third implementation.

Referring to FIG. 7 and FIG. 11, FIG. 11 is a schematic diagram of a partial structure of the foldable terminal 1000 shown in FIG. 7 according to a third implementation. FIG. 11 shows only the display 200, the axle center $C_1$ of the first arc-shaped part 33, the axle center $C_2$ of the second arc-shaped part 34, and the axle center $C_3$ of the fifth arc-shaped part 35.

The foldable terminal 1000 according to this implementation differs from the foldable terminal 1000 according to the first implementation in that the axle center $C_1$ of the first arc-shaped part 33, the axle center $C_2$ of the second arc-shaped part 34, and the axle center $C_3$ of the fifth arc-shaped part 35 are located at the same layer of the display 200.

In some other implementations, the axle center $C_1$ of the first arc-shaped part 33 and the axle center $C_2$ of the second arc-shaped part 34 may be located at the same layer of the display 200, but located at different layers from the axle center $C_3$ of the fifth arc-shaped part 35. Alternatively, the axle center $C_1$ of the first arc-shaped part 33 and the axle center $C_3$ of the fifth arc-shaped part 35 may be located at the same layer of the display 200, but located at different layers from the axle center $C_2$ of the second arc-shaped part 34. Alternatively, the axle center $C_2$ of the second arc-shaped part 34 and the axle center $C_3$ of the fifth arc-shaped part 35 are located at the same layer of the display 200, but located at different layers from the axle center $C_1$ of the first arc-shaped part 33, which is not specifically limited in this application.

Specifically, the axle center $C_1$ of the first arc-shaped part 33, the axle center $C_2$ of the second arc-shaped part 34, and the axle center $C_3$ of the fifth arc-shaped part 35 are located at the neutral layer 200a of the display 200, and are spaced apart from each other. That is, the axle center $C_1$ of the first arc-shaped part 33, the axle center $C_2$ of the second arc-shaped part 34, and the axle center $C_3$ of the fifth arc-shaped part 35 are located at the third structural layer 260 of the display 200. The axle center $C_2$ of the second arc-shaped part 34 is located between the axle center $C_1$ of the first arc-shaped part 33 and the axle center $C_3$ of the fifth arc-shaped part 35. In some other implementations, the axle center $C_1$ of the first arc-shaped part 33, the axle center $C_2$ of the second arc-shaped part 34, and the axle center $C_3$ of the fifth arc-shaped part 35 may alternatively be located at the fifth structural layer 280, the fourth structural layer 270, the second structural layer 250, or the first structural layer 240 of the display 200.

In this implementation, because the axle center $C_1$ of the first arc-shaped part 33, the axle center $C_2$ of the second arc-shaped part 34, and the axle center $C_3$ of the fifth arc-shaped part 35 are located at the neutral layer 200a of the display 200, and are spaced apart from each other, during folding of the foldable terminal 1000, a center of rotation of the first swing arm 30 is located at the neutral layer 200a when rotating with respect to the limit base 20, so that rotation of the first swing arm 30 with respect to the limit base 20 can match a change in the neutral layer 200a. Therefore, rotation processes of the first swing arm 30 and the second swing arm 40 can match a bending process of the display 200, so as to reduce stretching of the rotating mechanism 130 on the display 200, and avoid the problem that the display 200 has wrinkles due to stretching, thereby ensuring use reliability of the foldable terminal 1000.

Figure 12:
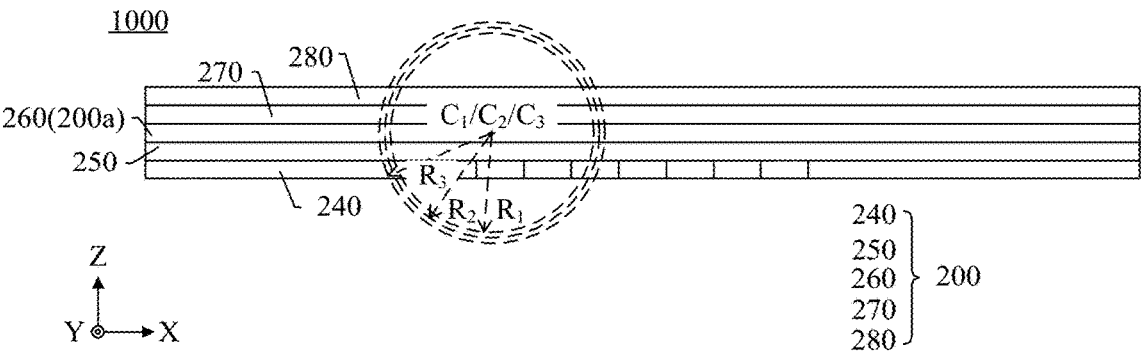
FIG. 12 is a schematic diagram of a partial structure of the foldable terminal shown in FIG. 7 according to a fourth implementation.

Referring to FIG. 7 and FIG. 12, FIG. 12 is a schematic diagram of a partial structure of the foldable terminal 1000 shown in FIG. 7 according to a fourth implementation. FIG. 12 shows only the display 200, the axle center $C_1$ of the first arc-shaped part 33, the radius $R_1$, the axle center $C_2$ of the second arc-shaped part 34, the radius $R_2$, the axle center $C_3$ of the fifth arc-shaped part 35, and the radius $R_3$.

The foldable terminal 1000 according to this implementation differs from the foldable terminal 1000 according to the second implementation in that the axle center $C_1$ of the first arc-shaped part 33, the axle center $C_2$ of the second arc-shaped part 34, and the axle center $C_3$ of the fifth arc-shaped part 35 are located at the same layer of the display 200, and coincide with each other.

In some other implementations, the axle center $C_1$ of the first arc-shaped part 33 may coincide with the axle center $C_2$ of the second arc-shaped part 34, but does not coincide with the axle center $C_3$ of the fifth arc-shaped part 35. Alternatively, the axle center $C_1$ of the first arc-shaped part 33 may coincide with the axle center $C_3$ of the fifth arc-shaped part 35, but does not coincide with the axle center $C_2$ of the second arc-shaped part 34. Alternatively, the axle center $C_2$ of the second arc-shaped part 34 and the axle center $C_1$ of the first arc-shaped part 33 may coincide with the axle center $C_3$ of the fifth arc-shaped part 35, but does not coincide with the axle center $C_1$ of the first arc-shaped part 33, which is not specifically limited in this application.

Specifically, the axle center $C_1$ of the first arc-shaped part 33, the axle center $C_2$ of the second arc-shaped part 34, and the axle center $C_3$ of the fifth arc-shaped part 35 are located at the neutral layer 200a of the display 200, and coincide with each other. That is, the axle center $C_1$ of the first arc-shaped part 33, the axle center $C_2$ of the second arc-shaped part 34, and the axle center $C_3$ of the fifth arc-shaped part 35 are located at the third structural layer 260. In some other implementations, the axle center $C_1$ of the first arc-shaped part 33, the axle center $C_2$ of the second arc-shaped part 34, and the axle center $C_3$ of the fifth arc-shaped part 35 may alternatively be located at the first structural layer 240, the second structural layer 250, the fourth structural layer 270 or the fifth structural layer 280 of the display 200.

In this implementation, because the axle center $C_1$ of the first arc-shaped part 33, the axle center $C_2$ of the second arc-shaped part 34, and the axle center $C_3$ of the fifth arc-shaped part 35 are located at the neutral layer 200a of the display 200, and are spaced apart from each other, during folding of the foldable terminal 1000, a center of rotation of the first swing arm 30 is located at the neutral layer 200a when rotating with respect to the limit base 20, so that rotation of the first swing arm 30 with respect to the limit base 20 can match a change in the neutral layer 200a. Therefore, rotation processes of the first swing arm 30 and the second swing arm 40 can match a bending process of the display 200, so as to reduce stretching of the rotating mechanism 130 on the display 200, and avoid the problem that the display 200 has wrinkles due to stretching, thereby ensuring use reliability of the foldable terminal 1000.

It should be noted that, in some other embodiments, the structure of the second swing arm 40 may alternatively be different from that of the first swing arm 30. For example, the first swing arm 30 is of the structure of the first swing arm 30 according to the first implementation, while the second swing arm 40 is of the structure of the first swing arm 30 according to the second implementation, the third implementation, or the fourth implementation; or the second swing arm 40 is not of the structure of the first swing arm 30 according to any one of the implementations. During folding of the foldable terminal 1000, the rotating mechanism 130 can also reduce stretching on the display 200, and avoid the problem that the display 200 has wrinkles due to stretching, thereby ensuring use reliability of the foldable terminal 1000.

The foregoing descriptions are merely specific implementations of this application, but the protection scope of this application is not limited thereto. Any person skilled in the art can easily conceive modifications or replacements within the technical scope of this application, and these modifications or replacements shall fall within the protection scope of this application. Embodiments of this application and features in the embodiments may be combined with each other, provided that no conflict occurs. Therefore, the protection scope of this application shall be subject to the protection scope of the claims.

What is claimed is:

1. A rotating mechanism, comprising:
a limit base comprising a first arc-shaped groove and a second arc-shaped groove;
a first swing arm; and
a second swing arm, wherein
the rotating mechanism is applied to a foldable terminal that comprises a display that comprises a neutral layer,
the first swing arm comprises a single structure that comprises a first rotating shaft portion, the first rotating shaft portion is slidably mounted in the first arc-shaped groove and is rotatable with respect to the limit base, the second swing arm comprises a single structure that comprises a second rotating shaft portion, the second rotating shaft portion is slidably mounted in the second arc-shaped groove and is rotatable with respect to the limit base, and the first rotating shaft portion and the second rotating shaft portion rotate in opposite directions with respect to the limit base, and
the first rotating shaft portion comprises a first arc-shaped part and a second arc-shaped part that are distributed in a circumferential direction of the first rotating shaft portion, the first arc-shaped part and the second arc-shaped part are fixedly connected along the single structure, an axle center of the first arc-shaped part and an axle center of the second arc-shaped part are both located at the neutral layer, and a radius of the first arc-shaped part is different from a radius of the second arc-shaped part.

2. The rotating mechanism according to claim 1, wherein a difference between the radius of the first arc-shaped part and the radius of the second arc-shaped part is 0.1 mm~10 cm.

3. The rotating mechanism according to claim 1, wherein the second rotating shaft portion comprises a third arc-shaped part and a fourth arc-shaped part that are distributed in a circumferential direction of the second rotating shaft portion, the third arc-shaped part and the fourth arc-shaped part are fixedly connected, an axle center of the third arc-shaped part and an axle center of the fourth arc-shaped part are both located at the neutral layer and coincide with each other, and a radius of the third arc-shaped part is different from a radius of the fourth arc-shaped part.

4. The rotating mechanism according to claim 3, wherein a difference between the radius of the third arc-shaped part and the radius of the fourth arc-shaped part is 0.1 mm~10 cm.

5. The rotating mechanism according to claim 3, wherein the first rotating shaft portion further comprises a fifth arc-shaped part distributed in the circumferential direction of the first rotating shaft portion, the fifth arc-shaped part is fixedly connected to one end that is of the second arc-shaped part and that is away from the first arc-shaped part, an axle center of the fifth arc-shaped part coincides with the axle center of the second arc-shaped part, and the radius of the third arc-shaped part is different from the radius of the second arc-shaped part; and
the second rotating shaft portion further comprises a sixth arc-shaped part distributed in the circumferential direction of the second rotating shaft portion, the sixth arc-shaped part is fixedly connected to the fourth arc-shaped part, an axle center of the sixth arc-shaped part coincides with an axle center of the fourth arc-shaped part, and a radius of the sixth arc-shaped part is different from the radius of the fourth arc-shaped part.

6. The rotating mechanism according to claim 5, wherein a difference between a radius of the fifth arc-shaped part and the radius of the second arc-shaped part is 0.1 mm~10 cm, and a difference between the radius of the sixth arc-shaped part and the radius of the fourth arc-shaped part is 0.1 mm~10 cm.

7. The rotating mechanism according to claim 1, wherein the first swing arm further comprises a first swing portion fixedly connected to the first rotating shaft portion along the single structure, and the first swing portion extends relative to the first arc-shaped groove; and
the second swing arm further comprises a second swing portion fixedly connected to the second rotating shaft portion along the single structure, and the second swing portion extends relative to the second arc-shaped groove.

8. The rotating mechanism according to claim 1, wherein the limit base comprises a lower limit block and an upper limit block, and the upper limit block is mounted on the lower limit block and encloses with the lower limit block to form the first arc-shaped groove and the second arc-shaped groove.

9. A rotating mechanism comprising:
a limit base comprising a first arc-shaped groove and a second arc-shaped groove;
a first swing arm; and
a second swing arm, wherein
the rotating mechanism is applied to a foldable terminal, wherein the foldable terminal comprises a display that comprises a first structural layer, a second structural layer, and a third structural layer that are laminated, wherein during folding of the foldable terminal, a stretching deformation amount of the first structural layer is greater than that of the second structural layer and a stretching deformation amount of the third structural layer is less than that of the second structural layer;
the first swing arm comprises a first rotating shaft portion, the first rotating shaft portion is slidably mounted in the first arc-shaped groove and may rotate with respect to the limit base, the second swing arm comprises a second rotating shaft portion, the second rotating shaft portion is slidably mounted in the second arc-shaped groove and may rotate with respect to the limit base, and the first rotating shaft portion and the second rotating shaft portion rotate in opposite directions with respect to the limit base;
the first rotating shaft portion comprises a first arc-shaped part and a second arc-shaped part that are distributed in a circumferential direction of the first rotating shaft portion, the first arc-shaped part and the second arc-shaped part are fixedly connected, an axle center of the first arc-shaped part is located at the first structural layer, an axle center of the second arc-shaped part is located at the second structural layer, and the axle center located in the first arc-shaped part is away from one side of the second swing arm; and the second rotating shaft portion comprises a third arc-shaped part and a fourth arc-shaped part that are distributed in a circumferential direction of the second rotating shaft portion and a fifth arc-shaped part that is distributed in the circumferential direction of the first rotating shaft portion, wherein the fifth arc-shaped part is fixedly connected to one end that is of the second arc-shaped part and that is away from the first arc-shaped part, an axle center of the fifth arc-shaped part is located at the third structural layer, and the axle center located in the second arc-shaped part is away from one side of the second swing arm.

10. The rotating mechanism according to claim 9, wherein a radius of the first arc-shaped part is the same as a radius of the second arc-shaped part, or the radius of the first arc-shaped part is different from the radius of the second arc-shaped part, and a difference between the radius of the first arc-shaped part and the radius of the second arc-shaped part is 0.1 mm~10 cm.

11. The rotating mechanism according to claim 9, wherein the third arc-shaped part and the fourth arc-shaped part are fixedly connected, an axle center of the third arc-shaped part is located at the first structural layer, an axle center of the fourth arc-shaped part is located at the second structural layer, and the axle center located in the third arc-shaped part is away from one side of the first swing arm.

12. The rotating mechanism according to claim 9, wherein the second rotating shaft portion further comprises a sixth arc-shaped part distributed in the circumferential direction of the second rotating shaft portion, the sixth arc-shaped part is fixedly connected to one end that is of the fourth arc-shaped part and that is away from the third arc-shaped part, an axle center of the sixth arc-shaped part is located at the third structural layer, and the axle center located in the fourth arc-shaped part is away from one side of the first swing arm.

13. The rotating mechanism according to claim 12, wherein a radius of the fifth arc-shaped part is the same as the radius of the second arc-shaped part.

14. A foldable terminal, comprising a first housing, a second housing, a display, and the rotating mechanism according to claim 1, wherein the first swing arm is fixedly connected to the first housing, the second swing arm is fixedly connected to the second housing, the display is mounted on the first housing and the second housing, and the display comprises the neutral layer.

15. The foldable terminal according to claim 14, wherein the display comprises a plurality of structural layers, and the neutral layer comprises one or more structural layers.

16. The foldable terminal according to claim 15, wherein the display comprises a substrate layer, a display functional layer, a polarizer, a bonding layer, and a protective layer that are sequentially laminated; and the neutral layer comprises the display functional layer, an axle center of the first arc-shaped part and an axle center of the second arc-shaped part are both located at the display functional layer, or the neutral layer comprises the polarizer, and the axle center of the first arc-shaped part and the axle center of the second arc-shaped part are both located in the polarizer.

17. The foldable terminal according to claim 14, wherein the display comprises a first display part, a second display part, and a bendable part, the bendable part is connected between the first display part and the second display part, the first display part is mounted on the first housing, the second display part is mounted on the second housing, and the bendable part is disposed opposite to the rotating mechanism.

18. The rotating mechanism according to claim 1, the neutral layer is a layer structure that is neither stretched nor compressed in the display during folding of the foldable terminal.

* * * * *